US009694306B2

(12) United States Patent
Anantharamaiah et al.

(10) Patent No.: US 9,694,306 B2
(45) Date of Patent: Jul. 4, 2017

(54) FILTER MEDIA INCLUDING POLYMER COMPOSITIONS AND BLENDS

(71) Applicant: Hollingsworth & Vose Company, East Walpole, MA (US)

(72) Inventors: Nagendra Anantharamaiah, Roanoke, VA (US); William S. Freeman, Roanoke, VA (US); Bruce Smith, Copper Hill, VA (US)

(73) Assignee: Hollingsworth & Vose Company, East Walpole, MA (US)

( * ) Notice: Subject to any disclaimer, the term of this patent is extended or adjusted under 35 U.S.C. 154(b) by 698 days.

(21) Appl. No.: 13/901,951

(22) Filed: May 24, 2013

(65) Prior Publication Data
US 2014/0346107 A1    Nov. 27, 2014

(51) Int. Cl.
*B01D 39/18* (2006.01)
*B01D 39/16* (2006.01)
*B01D 39/20* (2006.01)
*D01D 5/08* (2006.01)

(52) U.S. Cl.
CPC ......... *B01D 39/1623* (2013.01); *B01D 39/18* (2013.01); *B01D 39/2017* (2013.01); *B01D 2239/0654* (2013.01)

(58) Field of Classification Search
CPC .. D01D 5/08; D01D 5/28; D01D 5/38; D01D 7/00; D01D 1/00; B01D 39/18
USPC ............ 428/221, 292.1, 295.1, 304.4, 317.9; 264/638, 639, 640, 641, 211.14, 211.22; 210/505, 503, 500.1
See application file for complete search history.

(56) References Cited

U.S. PATENT DOCUMENTS

| 853,981 A | 5/1907 | Kneuper |
| 2,196,821 A | 4/1940 | Arnold |
| 2,392,901 A | 1/1946 | Brown |
| 2,928,765 A | 3/1960 | Kurjan et al. |
| 3,353,682 A | 11/1967 | Pall et al. |

(Continued)

FOREIGN PATENT DOCUMENTS

| CN | 1275923 A | 12/2000 |
| CN | 101098741 A | 1/2008 |

(Continued)

OTHER PUBLICATIONS

Extended European Search Report for EP11864804.7 mailed Oct. 7, 2015.

(Continued)

*Primary Examiner* — Allison Fitzsimmons
(74) *Attorney, Agent, or Firm* — Wolf, Greenfield & Sacks, P.C.

(57) ABSTRACT

Polymer compositions that may be used to form fibers for a fiber web are generally described. In some embodiments, certain properties of the polymer compositions (e.g., molecular weight distribution, melt flow index, melt elasticity, and/or melt toughness) may allow the formation of fiber webs having fine fibers and a relatively low amount of process defects. In some instances, these properties of the polymer composition may be achieved by combining two or more polymer components. Fiber webs formed using the polymer composition may have increased performance and/or better structural characteristics compared to fibers webs formed using a single polymer component.

26 Claims, 3 Drawing Sheets

(56) References Cited

U.S. PATENT DOCUMENTS

| | | |
|---|---|---|
| 3,849,241 A | 11/1974 | Butin et al. |
| 3,855,133 A | 12/1974 | Roehsler |
| 3,944,686 A | 3/1976 | Froberg |
| 4,018,646 A | 4/1977 | Ruffo et al. |
| 4,033,881 A | 7/1977 | Pall |
| 4,048,953 A | 9/1977 | Froberg |
| 4,102,785 A | 7/1978 | Head et al. |
| 4,188,197 A | 2/1980 | Amberkar et al. |
| 4,455,195 A | 6/1984 | Kinsley |
| 4,483,771 A | 11/1984 | Koch et al. |
| 4,622,259 A | 11/1986 | McAmish et al. |
| 4,759,989 A | 7/1988 | Abe et al. |
| 4,765,812 A | 8/1988 | Homonoff et al. |
| 4,765,915 A | 8/1988 | Diehl |
| 4,824,451 A | 4/1989 | Vogt et al. |
| 4,851,304 A | 7/1989 | Miwa et al. |
| 4,892,667 A | 1/1990 | Parker, III et al. |
| 4,904,385 A | 2/1990 | Wessling et al. |
| 4,925,601 A | 5/1990 | Vogt et al. |
| 5,021,284 A | 6/1991 | Miwa et al. |
| 5,108,474 A | 4/1992 | Reidy et al. |
| 5,108,827 A | 4/1992 | Gessner |
| 5,135,719 A | 8/1992 | Hillman et al. |
| 5,149,576 A | 9/1992 | Potts et al. |
| 5,167,765 A | 12/1992 | Nielsen et al. |
| 5,178,931 A | 1/1993 | Perkins et al. |
| 5,238,474 A | 8/1993 | Kahlbaugh et al. |
| 5,240,479 A | 8/1993 | Bachinski |
| 5,288,402 A | 2/1994 | Yoshida |
| 5,290,446 A | 3/1994 | Degen et al. |
| 5,306,321 A | 4/1994 | Osendorf |
| 5,342,424 A | 8/1994 | Pfeffer |
| 5,401,446 A | 3/1995 | Tsai et al. |
| 5,496,507 A | 3/1996 | Angadjivand et al. |
| 5,567,231 A | 10/1996 | Yokoo et al. |
| 5,571,604 A | 11/1996 | Sprang et al. |
| 5,580,459 A | 12/1996 | Powers et al. |
| 5,582,907 A | 12/1996 | Pall |
| 5,620,785 A | 4/1997 | Watt et al. |
| 5,647,881 A | 7/1997 | Zhang et al. |
| 5,648,027 A | 7/1997 | Tajiri et al. |
| 5,652,049 A | 7/1997 | Suzuki |
| 5,667,750 A | 9/1997 | Nohr et al. |
| 5,672,188 A | 9/1997 | Choi |
| 5,672,399 A | 9/1997 | Kahlbaugh et al. |
| 5,679,042 A | 10/1997 | Varona |
| 5,702,616 A | 12/1997 | Degen et al. |
| 5,708,162 A | 1/1998 | Hilbig et al. |
| 5,783,503 A | 7/1998 | Gillespie et al. |
| 5,785,725 A | 7/1998 | Cusick et al. |
| 5,786,065 A | 7/1998 | Annis et al. |
| 5,804,512 A | 9/1998 | Lickfield et al. |
| 5,935,883 A | 8/1999 | Pike |
| 5,952,251 A | 9/1999 | Jackson et al. |
| 5,955,174 A | 9/1999 | Wadsworth et al. |
| 5,993,501 A | 11/1999 | Cusick et al. |
| 6,007,608 A | 12/1999 | Johnson |
| 6,034,008 A | 3/2000 | Lim et al. |
| 6,099,729 A | 8/2000 | Cella et al. |
| 6,113,784 A | 9/2000 | Stoyell et al. |
| 6,120,939 A * | 9/2000 | Whear ................. D04H 1/4291 429/143 |
| 6,123,752 A | 9/2000 | Wu et al. |
| 6,171,369 B1 | 1/2001 | Schultink et al. |
| 6,171,684 B1 | 1/2001 | Kahlbaugh et al. |
| 6,183,536 B1 | 2/2001 | Schultink et al. |
| 6,193,773 B1 | 2/2001 | Schlor et al. |
| 6,251,224 B1 | 6/2001 | Dong |
| 6,261,979 B1 | 7/2001 | Tanaka et al. |
| 6,267,252 B1 | 7/2001 | Amsler |
| 6,315,806 B1 | 11/2001 | Torobin et al. |
| 6,372,004 B1 | 4/2002 | Schultink et al. |
| 6,422,396 B1 | 7/2002 | Li et al. |
| 6,428,610 B1 | 8/2002 | Tsai et al. |
| 6,476,135 B1 | 11/2002 | Bugada et al. |
| 6,489,051 B1 | 12/2002 | Inoue |
| 6,517,612 B1 | 2/2003 | Crouch et al. |
| 6,554,881 B1 | 4/2003 | Healey |
| 6,576,323 B2 | 6/2003 | Wise et al. |
| 6,579,350 B2 | 6/2003 | Doherty |
| 6,603,054 B2 | 8/2003 | Chen et al. |
| H2086 H | 10/2003 | Amsler |
| 6,706,086 B2 | 3/2004 | Emig et al. |
| 6,713,034 B2 | 3/2004 | Nakamura et al. |
| 6,743,273 B2 | 6/2004 | Chung et al. |
| 6,746,517 B2 | 6/2004 | Benson et al. |
| 6,759,356 B1 | 7/2004 | Myers |
| 6,858,057 B2 | 2/2005 | Healey |
| 6,872,311 B2 | 3/2005 | Koslow |
| 6,872,431 B2 | 3/2005 | Kahlbaugh et al. |
| 6,924,028 B2 | 8/2005 | Chung et al. |
| 6,936,554 B1 | 8/2005 | Singer et al. |
| 6,955,775 B2 | 10/2005 | Chung et al. |
| 6,977,111 B2 | 12/2005 | Yamaguchi et al. |
| 6,986,804 B2 | 1/2006 | Dominiak et al. |
| 7,008,465 B2 | 3/2006 | Graham et al. |
| 7,070,640 B2 | 7/2006 | Chung et al. |
| 7,097,694 B1 | 8/2006 | Jaroszczyk et al. |
| 7,137,510 B1 | 11/2006 | Klein et al. |
| 7,144,533 B2 | 12/2006 | Koslow |
| 7,163,625 B1 | 1/2007 | Williamson et al. |
| 7,179,317 B2 | 2/2007 | Chung et al. |
| 7,235,122 B2 | 6/2007 | Bryner et al. |
| 7,278,542 B2 | 10/2007 | Dussaud et al. |
| 7,309,372 B2 | 12/2007 | Kahlbaugh et al. |
| 7,314,497 B2 | 1/2008 | Kahlbaugh et al. |
| 7,316,723 B2 | 1/2008 | Chung et al. |
| 7,318,852 B2 | 1/2008 | Chung et al. |
| 7,319,122 B2 | 1/2008 | Cheng et al. |
| 7,390,760 B1 | 6/2008 | Chen et al. |
| 7,491,770 B2 | 2/2009 | Autran et al. |
| 7,578,938 B2 | 8/2009 | Rokman et al. |
| 7,597,773 B2 | 10/2009 | Kume et al. |
| 7,603,917 B2 | 10/2009 | Graham et al. |
| 7,645,312 B2 | 1/2010 | Hamlin et al. |
| 7,781,527 B2 | 8/2010 | Autran et al. |
| 7,918,913 B2 | 4/2011 | Kalayci et al. |
| 7,930,760 B2 | 4/2011 | Coles et al. |
| 7,960,478 B2 | 6/2011 | Autran et al. |
| 7,985,802 B2 | 7/2011 | Chien et al. |
| 7,993,427 B2 | 8/2011 | Hassmann et al. |
| 8,133,306 B2 | 3/2012 | Quayle et al. |
| 8,142,535 B2 | 3/2012 | Grove |
| 8,545,587 B2 | 10/2013 | Guimond et al. |
| 8,608,817 B2 | 12/2013 | Wertz et al. |
| 8,679,218 B2 | 3/2014 | Guimond et al. |
| 8,986,432 B2 | 3/2015 | Wertz et al. |
| 9,283,501 B2 | 3/2016 | Wertz et al. |
| 2001/0003082 A1 | 6/2001 | Kahlbaugh et al. |
| 2001/0035094 A1 | 11/2001 | Takagaki et al. |
| 2001/0045086 A1 | 11/2001 | Cox et al. |
| 2002/0013112 A1 | 1/2002 | Bontaites et al. |
| 2002/0056684 A1 | 5/2002 | Klein |
| 2002/0083837 A1 | 7/2002 | Doherty |
| 2002/0193553 A1 | 12/2002 | Qin et al. |
| 2003/0003834 A1 | 1/2003 | Berrigan et al. |
| 2003/0010210 A1 | 1/2003 | Kawano et al. |
| 2003/0057613 A1 | 3/2003 | Bansal et al. |
| 2003/0082979 A1 | 5/2003 | Bean et al. |
| 2003/0106294 A1 | 6/2003 | Chung et al. |
| 2003/0150199 A1 | 8/2003 | Tanaka et al. |
| 2003/0168401 A1 | 9/2003 | Koslow |
| 2003/0177909 A1 | 9/2003 | Koslow |
| 2003/0196963 A1 | 10/2003 | Koslow |
| 2003/0196964 A1 | 10/2003 | Koslow |
| 2003/0201231 A1 | 10/2003 | Koslow |
| 2003/0203696 A1 | 10/2003 | Healey |
| 2003/0205529 A1 | 11/2003 | Koslow |
| 2003/0205530 A1 | 11/2003 | Koslow |
| 2003/0205531 A1 | 11/2003 | Koslow |
| 2003/0211799 A1 | 11/2003 | Yao et al. |
| 2003/0211802 A1 | 11/2003 | Keck et al. |
| 2003/0213750 A1 | 11/2003 | Koslow |
| 2003/0220039 A1 | 11/2003 | Chen et al. |

(56) References Cited

U.S. PATENT DOCUMENTS

| | | |
|---|---|---|
| 2003/0226792 A1 | 12/2003 | Tumbrink et al. |
| 2004/0038014 A1 | 2/2004 | Schaefer et al. |
| 2004/0060268 A1 | 4/2004 | Chung et al. |
| 2004/0060269 A1 | 4/2004 | Chung et al. |
| 2004/0083695 A1 | 5/2004 | Schultink et al. |
| 2004/0112023 A1 | 6/2004 | Choi |
| 2004/0116026 A1 | 6/2004 | Kubose et al. |
| 2004/0116028 A1 | 6/2004 | Bryner |
| 2004/0123572 A1 | 7/2004 | Chung et al. |
| 2004/0135274 A1 | 7/2004 | Matsuda et al. |
| 2004/0163540 A1 | 8/2004 | Mori et al. |
| 2004/0178142 A1 | 9/2004 | Koslow |
| 2004/0187454 A1 | 9/2004 | Chung et al. |
| 2004/0211160 A1 | 10/2004 | Rammig et al. |
| 2004/0226886 A1 | 11/2004 | Hester et al. |
| 2004/0255783 A1 | 12/2004 | Graham et al. |
| 2004/0266300 A1 | 12/2004 | Isele et al. |
| 2005/0006303 A1 | 1/2005 | Sanders |
| 2005/0079379 A1 | 4/2005 | Wadsworth et al. |
| 2005/0109393 A1 | 5/2005 | Anderson |
| 2005/0109554 A1 | 5/2005 | Ishikawa et al. |
| 2005/0109557 A1 | 5/2005 | Dravet et al. |
| 2005/0136292 A1 | 6/2005 | Mariani et al. |
| 2005/0148261 A1 | 7/2005 | Close et al. |
| 2005/0183405 A1 | 8/2005 | Gillingham et al. |
| 2005/0193696 A1 | 9/2005 | Muller et al. |
| 2005/0210844 A1 | 9/2005 | Kahlbaugh et al. |
| 2005/0217226 A1 | 10/2005 | Sundet et al. |
| 2005/0235619 A1 | 10/2005 | Heinz et al. |
| 2005/0240517 A1 | 10/2005 | Wolzenski et al. |
| 2005/0241598 A1 | 11/2005 | Ezaki |
| 2005/0250726 A1 | 11/2005 | Krieg et al. |
| 2005/0266760 A1 | 12/2005 | Chhabra et al. |
| 2006/0000196 A1 | 1/2006 | Beier et al. |
| 2006/0084341 A1 | 4/2006 | Bodaghi et al. |
| 2006/0096260 A1 | 5/2006 | Bryner et al. |
| 2006/0096932 A1 | 5/2006 | Dema et al. |
| 2006/0117728 A1 | 6/2006 | Dolan et al. |
| 2006/0137317 A1 | 6/2006 | Bryner et al. |
| 2006/0137318 A1 | 6/2006 | Lim et al. |
| 2006/0169144 A1 | 8/2006 | Forslund |
| 2006/0196359 A1 | 9/2006 | Gillingham et al. |
| 2006/0205306 A1 | 9/2006 | Rock et al. |
| 2006/0230731 A1 | 10/2006 | Kalayci |
| 2006/0272303 A1 | 12/2006 | Fujiwara et al. |
| 2006/0277877 A1 | 12/2006 | Shields |
| 2006/0292947 A1 | 12/2006 | LaVietes et al. |
| 2007/0021021 A1 | 1/2007 | Verdegan et al. |
| 2007/0039300 A1 | 2/2007 | Kahlbaugh et al. |
| 2007/0054579 A1 | 3/2007 | Baker et al. |
| 2007/0065643 A1 | 3/2007 | Kopacz et al. |
| 2007/0066176 A1 | 3/2007 | Wenstrup et al. |
| 2007/0074628 A1 | 4/2007 | Jones et al. |
| 2007/0075015 A1 | 4/2007 | Bates et al. |
| 2007/0084786 A1 | 4/2007 | Smithies |
| 2007/0125700 A1 | 6/2007 | Ding et al. |
| 2007/0138698 A1 | 6/2007 | Gerndt et al. |
| 2007/0175192 A1 | 8/2007 | Niakan et al. |
| 2007/0175195 A1 | 8/2007 | Skirius et al. |
| 2007/0180997 A1 | 8/2007 | Leir et al. |
| 2007/0190319 A1 | 8/2007 | Kalayci |
| 2007/0220852 A1 | 9/2007 | Lifshutz et al. |
| 2007/0264520 A1 | 11/2007 | Wood et al. |
| 2007/0271883 A1 | 11/2007 | Chung et al. |
| 2007/0283808 A1 | 12/2007 | Chung et al. |
| 2008/0017038 A1 | 1/2008 | Wu |
| 2008/0022643 A1 | 1/2008 | Fox et al. |
| 2008/0026659 A1 | 1/2008 | Brandner et al. |
| 2008/0026661 A1 | 1/2008 | Fox et al. |
| 2008/0032110 A1 | 2/2008 | Wood et al. |
| 2008/0060328 A1 | 3/2008 | Devine |
| 2008/0069991 A1 | 3/2008 | Kohli et al. |
| 2008/0073296 A1 | 3/2008 | Dema et al. |
| 2008/0105626 A1 | 5/2008 | Jones et al. |
| 2008/0108265 A1 | 5/2008 | Pourdeyhimi et al. |
| 2008/0110822 A1 | 5/2008 | Chung et al. |
| 2008/0134652 A1 | 6/2008 | Lim et al. |
| 2008/0160856 A1 | 7/2008 | Chen et al. |
| 2008/0227919 A9* | 9/2008 | Li .................... C08L 23/10 525/240 |
| 2008/0245037 A1 | 10/2008 | Rogers et al. |
| 2008/0264259 A1 | 10/2008 | Leung |
| 2008/0302072 A1 | 12/2008 | Hassmann et al. |
| 2008/0302242 A1 | 12/2008 | Schelling et al. |
| 2008/0314009 A1 | 12/2008 | Ziebold et al. |
| 2008/0314010 A1 | 12/2008 | Smithies et al. |
| 2008/0318014 A1 | 12/2008 | Angadjivand et al. |
| 2009/0017710 A1 | 1/2009 | Bugada et al. |
| 2009/0039013 A1 | 2/2009 | Sakadume et al. |
| 2009/0042475 A1 | 2/2009 | Pourdeyhimi |
| 2009/0044702 A1 | 2/2009 | Adamek et al. |
| 2009/0050578 A1 | 2/2009 | Israel et al. |
| 2009/0077938 A1 | 3/2009 | Kume et al. |
| 2009/0078637 A1 | 3/2009 | Shane |
| 2009/0118451 A1 | 5/2009 | Fuchs et al. |
| 2009/0120048 A1 | 5/2009 | Wertz et al. |
| 2009/0120868 A1 | 5/2009 | Huppchen et al. |
| 2009/0142234 A1 | 6/2009 | Tatarchuk et al. |
| 2009/0266759 A1 | 10/2009 | Green |
| 2009/0301304 A1 | 12/2009 | Bass et al. |
| 2010/0000411 A1 | 1/2010 | Wertz et al. |
| 2010/0031618 A1 | 2/2010 | Grove, III |
| 2010/0044289 A1 | 2/2010 | Koslow |
| 2010/0107881 A1 | 5/2010 | Healey et al. |
| 2010/0116138 A1 | 5/2010 | Guimond et al. |
| 2010/0133173 A1 | 6/2010 | Inagaki |
| 2010/0187171 A1 | 7/2010 | Gupta |
| 2010/0187712 A1 | 7/2010 | Gupta et al. |
| 2010/0233927 A1 | 9/2010 | Standaert |
| 2010/0252510 A1 | 10/2010 | Godsay et al. |
| 2010/0282682 A1 | 11/2010 | Eaton et al. |
| 2010/0285101 A1 | 11/2010 | Moore et al. |
| 2010/0297720 A1 | 11/2010 | Medoff et al. |
| 2010/0323573 A1 | 12/2010 | Chu et al. |
| 2011/0059668 A1 | 3/2011 | Bieser et al. |
| 2011/0079553 A1 | 4/2011 | Thomson et al. |
| 2011/0139706 A1 | 6/2011 | Kalayci et al. |
| 2011/0147301 A1* | 6/2011 | Johnson ............ D01D 4/025 210/508 |
| 2011/0147976 A1 | 6/2011 | Wertz et al. |
| 2011/0151737 A1 | 6/2011 | Moore et al. |
| 2011/0215046 A1 | 9/2011 | Rogers et al. |
| 2011/0259813 A1 | 10/2011 | Wertz et al. |
| 2012/0067814 A1 | 3/2012 | Guimond et al. |
| 2012/0108714 A1 | 5/2012 | Wittner |
| 2012/0152821 A1 | 6/2012 | Cox et al. |
| 2012/0152824 A1 | 6/2012 | Cox et al. |
| 2012/0318754 A1 | 12/2012 | Cox et al. |
| 2013/0008846 A1 | 1/2013 | Rogers et al. |
| 2014/0144113 A1 | 5/2014 | Wertz et al. |
| 2015/0182885 A1 | 7/2015 | Thomson et al. |
| 2015/0182893 A1 | 7/2015 | Godsay et al. |
| 2015/0360156 A1 | 12/2015 | Swaminathan |
| 2016/0158677 A1 | 6/2016 | Cox et al. |
| 2016/0184751 A1 | 6/2016 | Wertz et al. |

FOREIGN PATENT DOCUMENTS

| | | |
|---|---|---|
| DE | 3341486 A1 | 5/1985 |
| DE | 198 54 565 A1 | 5/2000 |
| DE | 199 22 326 B4 | 2/2004 |
| DE | 10 2005 005 607 B3 | 3/2007 |
| DE | 20 2005 019 004 U1 | 4/2007 |
| DE | 10 2005 059 214 B4 | 10/2007 |
| DE | 10 2006 017 553 B3 | 12/2007 |
| DE | 20 2007 015 994 U1 | 1/2008 |
| EP | 0 109 282 B1 | 9/1988 |
| EP | 0 462 574 A1 | 12/1991 |
| EP | 0 612 551 A2 | 8/1994 |
| EP | 0 537 140 B1 | 10/1994 |
| EP | 0 587 682 B1 | 4/1995 |
| EP | 0 391 661 B1 | 9/1995 |
| EP | 0 847 784 A1 | 6/1998 |
| EP | 0 847 785 A1 | 6/1998 |

(56) References Cited

FOREIGN PATENT DOCUMENTS

| | | |
|---|---|---|
| EP | 0 847 786 A1 | 6/1998 |
| EP | 1 048 335 A1 | 11/2000 |
| EP | 0 719 172 B1 | 4/2002 |
| EP | 1 236 494 B1 | 9/2002 |
| EP | 0 793 990 B1 | 3/2003 |
| EP | 1 447 121 A1 | 8/2004 |
| EP | 1 048 335 B1 | 4/2005 |
| EP | 1 721 555 A1 | 11/2006 |
| EP | 1 775 006 A1 | 4/2007 |
| EP | 1 795 248 A2 | 3/2008 |
| EP | 1 483 039 B1 | 4/2008 |
| EP | 10759158.8 | 12/2012 |
| EP | 11775517.3 | 10/2013 |
| EP | 11864804.7 | 10/2015 |
| EP | 13807086.7 | 1/2016 |
| FR | 2828114 A1 | 2/2003 |
| GB | 1526448 A | 9/1978 |
| JP | 10-230114 A | 9/1998 |
| JP | 2002-001027 A | 1/2002 |
| JP | 2008-095266 A | 4/2008 |
| WO | WO 00/02006 A2 | 1/2000 |
| WO | WO 01/98574 A1 | 12/2001 |
| WO | WO 02/16681 A1 | 2/2002 |
| WO | WO 02/20668 A2 | 3/2002 |
| WO | WO 03/064006 A1 | 8/2003 |
| WO | WO 03/064013 A1 | 8/2003 |
| WO | WO 2004/028662 A2 | 4/2004 |
| WO | WO 2004/033069 A2 | 4/2004 |
| WO | WO 2004/069378 A2 | 8/2004 |
| WO | WO 2004/112937 A1 | 12/2004 |
| WO | WO 2004/112956 A1 | 12/2004 |
| WO | WO 2005/034659 A2 | 4/2005 |
| WO | WO 2006/030407 A1 | 3/2006 |
| WO | WO 2006/049664 A1 | 5/2006 |
| WO | WO 2006/053295 A1 | 5/2006 |
| WO | WO 2006/071979 A1 | 7/2006 |
| WO | WO 2006/071980 A1 | 7/2006 |
| WO | WO 2006/074383 A2 | 7/2006 |
| WO | WO 2006/096180 A1 | 9/2006 |
| WO | WO 2007/024445 A1 | 3/2007 |
| WO | WO 2007/041310 A2 | 4/2007 |
| WO | WO 2007/041311 A2 | 4/2007 |
| WO | WO 2007/068302 A1 | 6/2007 |
| WO | WO 2007/068408 A1 | 6/2007 |
| WO | WO 2007/068444 A1 | 6/2007 |
| WO | WO 2007/076015 A2 | 7/2007 |
| WO | WO 2007/112443 A2 | 10/2007 |
| WO | WO 2008/011450 A1 | 1/2008 |
| WO | WO 2008/016771 A1 | 2/2008 |
| WO | WO 2008/052970 A1 | 5/2008 |
| WO | WO 2008/057397 A1 | 5/2008 |
| WO | WO 2008/057431 A2 | 5/2008 |
| WO | WO 2008/066813 A2 | 6/2008 |
| WO | WO 2008/103736 A1 | 8/2008 |
| WO | WO 2008/103821 A2 | 8/2008 |
| WO | WO 2008/150548 A2 | 12/2008 |
| WO | WO 2009/062009 A2 | 5/2009 |
| WO | WO 2009/085679 A1 | 7/2009 |
| WO | PCT/US2008/082759 | 8/2009 |
| WO | PCT/US2009/005963 | 2/2010 |
| WO | PCT/US2008/082759 | 5/2010 |
| WO | PCT/US2009/005963 | 7/2010 |
| WO | WO 2010/101640 A1 | 9/2010 |
| WO | PCT/US2010/000996 | 11/2010 |
| WO | PCT/US2009/005963 | 5/2011 |
| WO | WO 2011/058118 A1 | 5/2011 |
| WO | PCT/US2011/034074 | 7/2011 |
| WO | PCT/US2010/000996 | 10/2011 |
| WO | PCT/US2011/054898 | 2/2012 |
| WO | PCT/US2011/065499 | 4/2012 |
| WO | PCT/US2011/034074 | 11/2012 |
| WO | PCT/US2011/065499 | 6/2013 |
| WO | PCT/US2013/046746 | 11/2013 |
| WO | PCT/US2011/054898 | 2/2014 |
| WO | PCT/US2014/039067 | 9/2014 |
| WO | PCT/US2013/046746 | 12/2014 |
| WO | PCT/US2014/039067 | 11/2015 |

OTHER PUBLICATIONS

International Preliminary Report on Patentability for Application No. for PCT/US2011/054898 mailed Feb. 27, 2014.
International Preliminary Report on Patentability for PCT/US2013/046746 mailed Dec. 31, 2014.
International Search Report and Written Opinion for PCT/US2014/039067 mailed Sep. 4, 2014.
[No Author Listed] Polymer Degradation and Stability research Developments. Albertov, Ed. 2007. Nova Science Publishers. Book Description and Table of Contents. Accessed from <https://www.novapublishers.com/catalog/product_info.php?products_id=5855> on Sep. 17, 2015.
Bresee et al. Influence of Processing Conditions on Melt Blown Web Structure: Part 1—DCD. INJ Spring 2004, p. 49-55.
Bresee et al. Influence of Processing Conditions on Melt Blown Web Structure: Part 2—Primary Airflow Rate. INJ Summer 2005, p. 11-8.
Bresee et al. Influence of Processing Conditions on Melt Blown Web Structure: Part 3—Water Quench. INJ Winter 2005, p. 27-35.
Chung, Extrusion of Polymers, Theory and Practice. 2nd Edition; Sample Chapter 2: Physical Description of Single-Screw Extrusion. Hanser Publishers, Munich: 46 pages.
Dutton, Overview and Analysis of the Meltblown Process and Parameters. NC State University, College of textiles. Journal of Textile and Apparel, Technology and Management. 2008;6(1):1-25.
Ellison et al., Melt blown nanofibers: Fiber diameter distributions and onset of fiber breakup. Polymer. May 21, 2007;48(11):3306-16.
Grafe et al., Polymeric Nanofibers and Nanofiber Webs: A New Class of Nonwovens. INJ Spring 2003: 51-5.
Nayak, Fabrication and characterization of polypropylene nanofibres by melt electrospinning and meltblowing. Doctoral Thesis. RMIT University, School of Fashion and Textiles. Mar. 2012.
Podgórski et al., Application of nanofibers to improve the filtration efficiency of the most penetrating aerosol particles in fibrous filters. Chem Eng Sci. Oct. 2006;61(20):6804-15.
Shin et al., A Fundamental Investigation of the Formation and Properties of Electrospun Fibers. National Textile Center Annual Report. Nov. 2001; M98-D01: 9 pages.
Warner et al., A Fundamental Investigation of the Formation and Properties of Electrospun Fibers. National Textile Center Annual Report. Nov. 1999; M98-D01: 10 pages.
U.S. Appl. No. 12/971,456, filed Dec. 17, 2010, Wertz et al.
U.S. Appl. No. 14/169,994, filed Jan. 31, 2014, Wertz et al.
U.S. Appl. No. 12/971,539, filed Dec. 17, 2010, Cox et al.
U.S. Appl. No. 14/584,155, filed Dec. 29, 2014, Thomson et al.
U.S. Appl. No. 12/971,594, filed Dec. 17, 2010, Cox et al.
U.S. Appl. No. 14/874,561, filed Oct. 5, 2015, Cox et al.
U.S. Appl. No. 13/528,796, filed Jun. 20, 2012, Cox et al.
U.S. Appl. No. 12/496,588, filed Jul. 1, 2009, Wertz et al.
U.S. Appl. No. 12/768,318, filed Apr. 27, 2010, Wertz et al.
U.S. Appl. No. 12/899,512, filed Oct. 6, 2010, Thomson et al.
U.S. Appl. No. 13/528,796, filed Jun. 20, 2010, Cox et al.
Invitation to Pay Additional Fees for International Application No. PCT/US2009/005963, mailed Feb. 1, 2010.
International Search Report and Written Opinion for International Application No. PCT/US2009/005963, mailed Jul. 21, 2010.
International Preliminary Report on Patentability for International Application No. PCT/US2009/005963, mailed May 19, 2011.
International Search Report and Written Opinion for Application No. PCT/US2008/082759 mailed Aug. 4, 2009.
International Preliminary Report on Patentability for Application No. PCT/US2008/082759 mailed May 20, 2010.
European Search Report for EP 10759158.8 mailed on Dec. 5, 2012.
International Search Report and Written Opinion for Application No. PCT/US2010/000996 mailed Nov. 29, 2010.
International Preliminary Report on Patentability for Application No. PCT/US2010/000996 mailed Oct. 13, 2011.

(56) References Cited

OTHER PUBLICATIONS

Extended European Search Report for EP 11775517.3 mailed on Oct. 9, 2013.
International Search Report and Written Opinion for PCT/US2011/034074 mailed on Jul. 11, 2011.
International Preliminary Report on Patentability for PCT/US2011/034074 mailed on Nov. 8, 2012.
International Search Report and Written Opinion for PCT/US2011/065499 mailed Apr. 20, 2012.
International Preliminary Report on Patentability for Application No. for PCT/US2011/065499 mailed Jun. 27, 2013.
International Search Report for Application No. PCT/US2011/054898 mailed Feb. 27, 2012.
International Search Report and Written Opinion for PCT/US2013/046746 mailed Nov. 5, 2013.
[No Author Listed] Global industrial solutions, vacuum dehydration oil purification system. Brochure. Date not available.
[No Author Listed] HV Product Table. Hollingsworth & Vose. Table. 1 page.
[No Author Listed] Utipor III filter element speficiations. Pall Corporation. Date not available. pp. 15-19.
[No Author Listed] Vaccum dehydration oil purification system. Brochure. Oil Filtration Systems, Inc. Date unavailable.
Berkalp, Air Permeability & Porosity in Spun-laced Fabrics. Fibres and Textiles in Eastern Europe. 2006; 14(3): 81-5.
Dahiya et al., Melt Blown Technology. Apr. 2004. 13 pages.
Deka et al., Filtration News. 2004;22(4): :24, 26, 28, 30, 32 and 33.
Kaukopaasi et al, Nonwoven Conference, 1991, p. 137-154.
Kaukopaasi et al, TAPPI Journal. 1992;75(1):127-32.
Keith et al., The Surface Area of Fibrous Filters. Tobacco Science. 1977;68-72. Accessed Sep. 19, 2013.
Lloyd et al., TAPPI Journal. 1998;81(11):194-202.
Montefusco et al., Filtration and Separation. 2005;42(2):30-1.
Rodman et al., Fibers for nonwovens with emphasis on filtration theory and applications. Albany International Research Co. Mansfield, MA. pp. 233-246, date N/A.
U.S. Appl. No. 14/984,406, filed Dec. 30, 2015, Wertz et al.
Extended European Search Report for EP13807086.7 mailed Jan. 14, 2016.
International Preliminary Report on Patentability for PCT/US2014/039067 mailed Nov. 24, 2015.

\* cited by examiner

FILTER MEDIA INCLUDING POLYMER COMPOSITIONS AND BLENDS

FIELD OF INVENTION

Polymer compositions that may be used to form fibers for a fiber web, including those suitable for use as filter media, as well as related assemblies, systems and methods, are described.

BACKGROUND

Filter media can be used to remove contamination in a variety of applications. Depending on the application, the filter media may be designed to have different performance characteristics. In general, filter media can be formed of a non-woven web of fibers. The non-woven web provides a porous structure that permits fluid (e.g., a liquid or a gas) to flow through the filter media. Contaminant particles contained within the fluid may be trapped on the non-woven web. Filter media characteristics, such as fiber diameter and basis weight, affect filter performance including filter efficiency and resistance to fluid flow through the filter.

Fiber webs can be formed by different processes. In a meltblowing process, a fiber web may be formed by extruding a polymeric material through a die and then attenuating the resulting filaments with a heated, high-velocity air stream. This process may generate fine fibers that can be collected onto a moving collector belt where they intertwine with each other to form a fiber web. Properties of the polymeric material used to form the fibers can affect the structural and performance characteristics of the resulting fiber webs. Improvements in the polymeric material may lead to fiber webs having improved structural and performance characteristics, such as reduced fiber diameters, reduced process defects, and/or increased surface area. Such improvements would find use in a number of different fields where fiber webs can be used, such as in filtration applications.

SUMMARY OF THE INVENTION

Polymer compositions that may be used to form fibers for a fiber web and related components, systems, and methods associated therewith are provided. The subject matter of this application involves, in some cases, interrelated products, alternative solutions to a particular problem, and/or a plurality of different uses of structures and compositions.

In one set of embodiments, a series of fiber webs are provided. In one embodiment, a fiber web comprises a plurality of fibers comprising a polypropylene composition, wherein the polypropylene composition has a $M_z$ of greater than or equal to about 130,000 and a $M_n$ of less than or equal to about 55,000.

In another embodiment, a fiber web comprises a plurality of fibers comprising a polypropylene composition comprising a first polypropylene component and a second polypropylene component, wherein the polypropylene composition has a $M_z$ of greater than or equal to about 100,000 and a $M_n$ of less than or equal to about 55,000.

In another set of embodiments, a series of methods are provided. In one embodiment, a method comprises providing a polypropylene composition comprising a first polypropylene component and a second polypropylene component, wherein the polypropylene composition has a $M_z$ of greater than or equal to about 100,000 or a $M_n$ of less than or equal to about 55,000, and a melt flow index of greater than or equal to about 400 grams per 10 minutes. The method may comprise forming a plurality of fibers from the polypropylene composition.

In another embodiment, a method comprises providing a polypropylene composition comprising a first polypropylene component and a second polypropylene component, wherein the polypropylene composition has a melt flow index of greater than or equal to about 400 grams per 10 minutes, and wherein each polypropylene component in the composition has a melt flow rate greater than about 25 grams per 10 minutes. The method may comprise forming a plurality of fibers from the polypropylene composition.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Polymer compositions that may be used to form fibers for a fiber web are provided. In some embodiments, certain properties of the polymer compositions (e.g., molecular weight distribution, melt flow index, melt elasticity, and/or melt toughness) may allow fine fibers to be formed with a relatively low amount of process defects, such as polymeric particles resulting from polymer degradation during extrusion. In some instances, certain properties of the polymer composition may be achieved by using two or more polymer components. For instance, in some embodiments, a first polymer component having a first molecular weight distribution and melt flow index may be combined with a second polymer component having a second molecular weight distribution and melt flow index. The polymer composition comprising the first and second polymer components may have a desired overall molecular weight distribution and/or melt flow index that are different than those of its components. In some instances, fiber webs formed from the polymer composition may have reduced process defects and/or finer fibers than fiber webs formed from the individual components under similar conditions. In some embodiments, fiber webs described herein have relatively low air permeability and/or a relatively high surface area, which can lead to increased performance.

As described in more detail below, polymer fiber extrusion processes can be used to form fiber webs having fine fibers. However, a problem associated with fine fiber production is the formation of process defects during extrusion. In general, polymer fiber extrusion processes for fine fiber production utilize relatively low polymer throughput and relatively high temperatures and pressures. The extrusion conditions during fiber formation can adversely affect certain polymer compositions and lead to the formation of process defects such as degraded polymeric material in the form of particles, twinning of fibers, bundling of fibers, and/or fiber fly (fugitive fiber). As the amount of process defects increases, less fiber is produced per unit of polymer composition. For fiber webs used for filtration or certain other applications, this occurrence is not desirable as it may result in having to form fiber webs having a higher basis weight in order to achieve the same level of performance as fiber webs without process defects, all other factors being equal.

Figure 1:
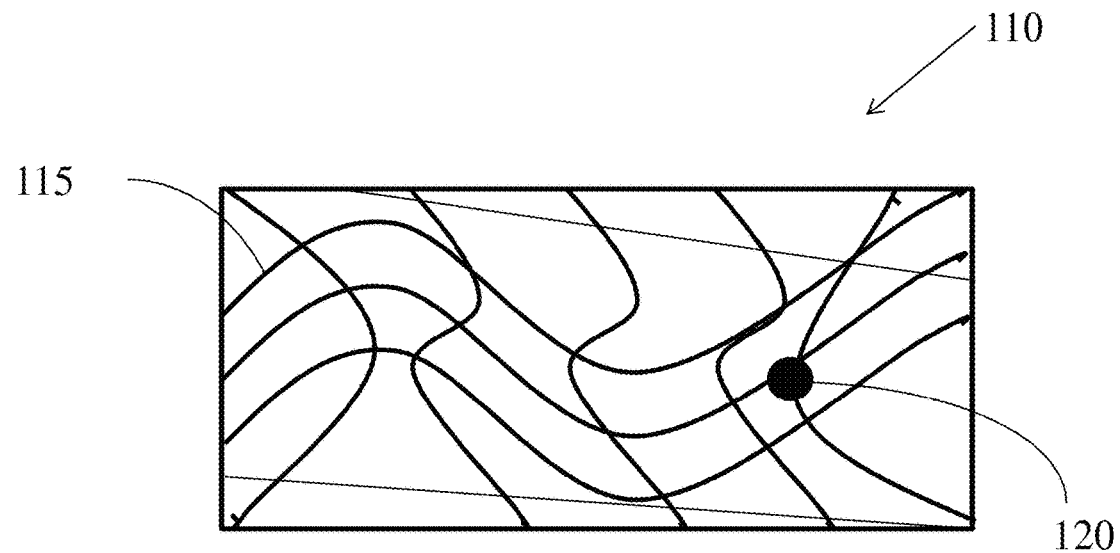
FIG. 1 illustrates a fiber web having fine fibers according to certain embodiments.

Polymer compositions have been discovered in the context of the invention that allow the formation of fine fiber webs having relatively low amounts of process defects and accordingly increased performance and/or better structural characteristics, e.g., compared to fibers webs formed using a single polymer component. As illustrated in FIG. 1, a polymer composition may be formulated to produce a fiber web 110, shown in cross-section, comprising fibers 115 having a relatively small diameter (e.g., less than or equal to 1 micron) and relatively low amounts of process defects 120 (e.g., polymeric particles resulting from polymer degradation during an extrusion process). For instance, in some embodiments, a fiber web having fine fibers and substantially no process defects may be formed using a polymer fiber extrusion processes. In some instances, the fiber web may have advantageous structural and/or performance characteristics (e.g., surface area, air permeability, airflow resistance, etc.).

In general, the polymer compositions described herein may comprise one or more polymer components. In some embodiments, the polymer compositions described herein may include a polypropylene component. In certain embodiments, two or more (e.g., three, four) polypropylene components may be included in a polymer composition. In some embodiments, a polypropylene polymer in the polymer composition may have been synthesized using a catalyst, such as a homogenous catalyst (e.g., metallocene) or a heterogeneous catalyst (e.g., Ziegler-Natta). Examples of specific polymer components that may be used include polypropylenes (e.g., Lyondell Basell MF650W, Lyondell Basell MF650X, Lyondell Basell MF650Y, Total SA PPH 3962, ExxonMobil Achieve 6936G1, Borealis Borflow HL504FB, Borealis Borflow HL508FB, and Borealis Borflow HL516FB). In certain embodiments, one or more polypropylene components (e.g., two, three, four) in the polymer composition may be synthesized using a metallocene catalyst (e.g., metallocene catalyst with Zr metal centers, metallocene catalyst with Ti metal centers, parallel metallocenes, multi-decker metallocenes, half-sandwich metallocenes, bent metallocenes, mono-cyclopentadienyl constrained metallocene catalyst, mono- and bis-cyclopentadienyl metallocenes, etc.). In some embodiments, each of the polypropylene components in a polymer composition may be synthesized using a metallocene catalyst. Without wishing to be bound by theory, it is believed that metallocene catalysts produce polypropylene components having a relatively narrow molecular weight distribution compared to certain other catalysts (e.g., Ziegler-Natta catalysts). In general, a polypropylene polymer produced by any suitable metallocene catalyst may be used in the polymer composition.

As described herein, the polymer composition may have a certain overall molecular weight distribution and/or melt flow index. Without wishing to be bound by theory, it is believed that the molecular weight distribution and/or melt flow index of the polymer composition may be important parameters for fiber web formation. For instance, it is believed that certain average molecular weights (e.g., number average molecular weight, Z-average molecular weight) and/or the melt flow index may be related to certain properties of the resulting polymer and/or fiber characteristics. For example, the Z-average molecular weight ($M_z$) of the polymer composition may relate to polymer material toughness (e.g., melt elasticity, melt toughness). Without wishing to be bound by theory, it is believed that the entanglement observed in longer polymer chains may contribute to polymer material toughness. In some instances, the amount of process defects produced during fiber web formation may be affected by the polymer material toughness. In one example, a polymer composition with a relatively high $M_z$ (e.g., greater than or equal to about 100,000 g/mol, greater than or equal to about 130,000 g/mol, or other value described herein) may be able to undergo a fiber extrusion process without breaking. In some embodiments, the number average molecular weight and/or melt flow index may contribute to the formation of fine fibers and/or the processability of the polymer composition. For instance, a low $M_n$ (e.g., less than or equal to about 55,000 g/mol or other value described herein) and/or a certain melt flow index range (e.g., greater than or equal to about 400 or other value described herein) may allow the polymer composition to undergo a large amount of attenuation and/or stretching during fiber web formation. In some cases, specific average molecular weights and/or melt flow index values are needed to form fine fibers with relatively low amounts of process defects.

In some embodiments, the desired overall average molecular weights and/or melt flow index may be achieved using one polymer component. In other instances, the desired overall average molecular weights and/or melt flow index may be achieved using two or more polymer components. In some such cases, a polymer component may be used to impart certain properties (e.g., high $M_z$) and another polymer component may be used to impart other properties (e.g., high melt flow rate). In some embodiments, a polymer component may have a property (e.g., $M_n$, $M_w$) that is substantially similar to or the same as that of another polymer component and/or the polymer composition. In certain embodiments, a polymer component may have a property (e.g., $M_z$, melt flow index) that is different from that of another polymer component and/or the polymer composition.

In certain embodiments, the use of two or more polymer components may be advantageous. For instance, in some embodiments, the breadth of the molecular weight distribution (e.g., polydispersity index, $M_z/M_w$), as described in more detail below, may be broader for a polymer composition containing two or more polymer components than a polymer composition containing one polymer component. For example, a single polymer component with the desired overall average molecular weights may have a relatively narrow molecular weight distribution, which may result in a relatively low polymer material toughness (e.g., melt elasticity, melt toughness). The use of two or more polymer components to achieve the desired average molecular weights may result in a broader molecular weight distribution and a relatively high polymer material toughness. In some instances, the broader molecular weight distribution and higher melt flow index may allow the polymer composition to undergo certain processing conditions (e.g., higher rate of extrusion), which result in finer fibers or a lower amount of process defects.

As mentioned above, the polymer composition may be formulated to have certain average molecular weights (e.g., $M_n$, $M_z$, $M_w$) that are beneficial to the formation of fine fiber webs having relatively low amounts of process defects. As known to those of ordinary skill in the art, the number average ($M_n$), weight average ($M_w$), and Z-average ($M_z$) molecular weights are defined by the corresponding equations below, where $N_i$ is the number of molecules of each polymer species and $M_i$ is the molar mass of that polymer species.

$$M_n = \frac{\sum M_i N_i}{\sum N_i},$$

$$M_w = \frac{\sum M_i^2 N_i}{\sum M_i N_i},$$

$$M_i = \frac{\sum M_i^3 N_i}{\sum M_i^2 N_i}$$

In some embodiments, the number average molecular weight ($M_n$) of a polymer composition may be greater than or equal to about 15,000 g/mol, greater than or equal to about 25,000 g/mol, greater than or equal to about 35,000 g/mol, greater than or equal to about 45,000 g/mol, greater than or equal to about 55,000 g/mol, or greater than or equal to about 65,000 g/mol. In some instances, the number average molecular weight of the polymer composition may be less than or equal to about 75,000 g/mol, less than or equal to about 65,000 g/mol, less than or equal to about 55,000 g/mol, less than or equal to about 45,000 g/mol, less than or equal to about 35,000 g/mol, or less than or equal to about 25,000 g/mol. It should be understood that all combinations of the above-referenced ranges are possible (e.g., greater than or equal to about 25,000 g/mol and less than or equal to about 55,000 g/mol, greater than or equal to about 15,000 g/mol and less than or equal to about 75,000 g/mol). Other values of number average molecular weight are possible.

The average molecular weights (e.g., $M_n$, $M_z$, $M_w$) described herein were measured according to the standard ASTM D6474-12 using a high temperature gel permeation chromatography (HT-GPC). For example, for a polymer composition comprising a polypropylene component, 200 microliters of a 4 mg/mL sample was run on a Two Varian PLGel Mixed-B LS 300×7.5 mm column at a temperature of 160° C. and a flow rate of 1.0 ml/min of trichlorobenzene (TCB) containing 0.5 mg/mL of BHT.

In some embodiments, the Z-average molecular weight ($M_z$) of the polymer composition may be greater than or equal to about 100,000 g/mol, greater than or equal to about 130,000 g/mol, greater than or equal to about 160,000 g/mol, greater than or equal to about 190,000 g/mol, greater than or equal to about 210,000 g/mol, greater than or equal to about 240,000 g/mol, greater than or equal to about 270,000 g/mol, greater than or equal to about 300,000 g/mol, greater than or equal to about 330,000 g/mol, greater than or equal to about 360,000 g/mol, or greater than or equal to about 390,000 g/mol. In some instances, Z-average molecular weight of the polymer composition may be less than or equal to about 400,000 g/mol, less than or equal to about 375,000 g/mol, less than or equal to about 350,000 g/mol, less than or equal to about 325,000 g/mol, less than or equal to about 300,000 g/mol, less than or equal to about 275,000 g/mol, less than or equal to about 250,000 g/mol, less than or equal to about 200,000 g/mol, less than or equal to about 175,000 g/mol, or less than or equal to about 150,000. It should be understood that all combinations of the above-referenced ranges are possible (e.g., greater than or equal to about 130,000 g/mol and less than or equal to about 300,000 g/mol, greater than or equal to about 100,000 g/mol and less than or equal to about 400,000 g/mol). Other values of Z-average molecular weight are also possible. In some embodiments, the weight average molecular weight ($M_w$) of the polymer composition may be greater than or equal to about 50,000 g/mol, greater than or equal to about 60,000 g/mol, greater than or equal to about 70,000 g/mol, greater than or equal to about 80,000 g/mol, greater than or equal to about 90,000 g/mol, greater than or equal to about 100,000 g/mol, or greater than or equal to about 110,000 g/mol, or greater than or equal to about 120,000 g/mol. In some instances, the weight average molecular weight may be less than or equal to about 130,000 g/mol, less than or equal to about 120,000 g/mol, less than or equal to about 110,000 g/mol, less than or equal to about 100,000 g/mol, less than or equal to about 90,000 g/mol, less than or equal to about 80,000 g/mol, less than or equal to about 70,000 g/mol, less than or equal to about 60,000 g/mol, or less than or equal to about 50,000 g/mol. It should be understood that all combinations of the above-referenced ranges are possible (e.g., greater than or equal to about 60,000 g/mol and less than or equal to about 100,000 g/mol, greater than or equal to about 50,000 g/mol and less than or equal to about 130,000 g/mol). Other values of weight average molecular weight are also possible.

In some instances, the average molecular weights and their ratios may be used to characterize the breadth of the molecular weight distribution of the polymer composition. For instance, in some embodiments, the polydispersity index ($M_w/M_n$) may be used to describe the breadth of the molecular weight distribution. However, in some instances, the polydispersity index may not fully characterize the molecular weight distribution. For example, a skew in the molecular weight distributions, e.g., toward high molecular weights may not be captured by the polydispersity index. In some instances, other molecular weight ratios, either used alone or in combination with the polydispersity index, are used to characterize the molecular weight distribution. In certain embodiments, the ratio of $M_z$ to $M_w$ in combination with the polydispersity index may be used to characterize the breadth of the molecular weight distribution of a polymer composition. For example, when $M_z/M_w$ is larger than $M_w/M_n$ the polymer composition has a pronounced high molecular weight portion.

In some embodiments, the polydispersity index of the polymer composition may be greater than or equal to about 1.6, greater than or equal to about 1.7, greater than or equal to about 1.8, greater than or equal to about 2.0, greater than or equal to about 2.2, greater than or equal to about 2.4, greater than or equal to about 2.6, greater than or equal to about 2.8, greater than or equal to about 3.0, greater than or equal to about 3.2, greater than or equal to about 3.6, greater than or equal to about 4.0, greater than or equal to about 4.4, or greater than or equal to about 5.0. In some instances, the polydispersity index of a polymer composition may be less than or equal to about 5.5, less than or equal to about 5.0, less than or equal to about 4.5, less than or equal to about 4.0, less than or equal to about 3.5, less than or equal to about 3.3, less than or equal to about 3.2, less than or equal to about 3.0, less than or equal to about 2.8, less than or equal to about 2.6, less than or equal to about 2.4, less than or equal to about 2.2, less than or equal to about 2.0, or less than or equal to about 1.8. It should be understood that all combinations of the above-referenced ranges are possible (e.g. greater than or equal to about 1.8 and less than or equal to about 2.6, greater than or equal to about 1.7 and less than or equal to about 5.0). Other values of polydispersity index are also possible.

In some embodiments, the ratio of $M_z$ to $M_w$ ($M_z/M_w$) may be greater than or equal to about 1.8, greater than or equal to about 1.9, greater than or equal to about two, greater than or equal to about 2.2, greater than or equal to about 2.4, greater than or equal to about 2.6, greater than or equal to about 2.8, or greater than or equal to about 3.0. In some instances, the ratio of $M_z$ to $M_w$ may be less than or equal to about 3.2, less than or equal to about 3.0, less than or equal to about 2.8, less than or equal to about 2.6, less than or equal to about 2.4, less than or equal to about 2.2, or less than or equal to about 2.0. It should be understood that all combinations of the above referenced ranges are possible (e.g., greater than or equal to about 1.9 and less than or equal to about 3.0, greater than or equal to about 1.8 and less than or equal to about 3.2). Other values of the ratio of $M_z$ to $M_w$ are also possible.

In some embodiments, the polymer composition may be formulated to have a melt flow index that allows the formation of fiber webs having fine fibers and a relatively low amount of process defects. For instance, in some embodiments, the melt flow index of the polymer composition may be greater than or equal to about 400 g/10 minutes, greater than or equal to about 550 g/10 minutes, greater than or equal to about 700 g/10 minutes, greater than or equal to about 850 g/10 minutes, greater than or equal to about 1,000 g/10 minutes, greater than or equal to about 1,150 g/10 minutes, greater than or equal to about 1,300 g/10 minutes, or greater than or equal to about 1,450 g/10 minutes. In some instances, the melt flow index may be less than or equal to about 1,500 g/10 minutes, less than or equal to about 1,350 g/10 minutes, less than or equal to about 1,200 g/10 minutes, less than or equal to about 1,050 g/10 minutes, less than or equal to about 900 g/10 minutes, less than or equal to about 750 g/10 minutes, or less than or equal to about 600 g/10 minutes. It should be understood that all combinations of the above-referenced ranges are possible (e.g., greater than or equal to about 700 g/10 minutes and less than or equal to about 1,200 g/10 minutes, greater than or equal to about 400 g/10 minutes and less than or equal to about 1,500 g/10 minutes). Other values of melt flow index are also possible.

As used herein, melt flow index is measured according to the standard ASTM D1238/ISO 1133, which uses a melt flow tester. For example, for a polymer composition including one or more polypropylenes, about 4 to 5 grams of the polymer composition are placed into the furnace and the material is packed properly to avoid formation of air pockets in the melt flow tester. The sample is preheated for 6 min at 230° C. After the pre-heat step, 2.16 kg of the polymer composition is placed on a piston which causes the molten polymer to flow. Test results, i.e., weight of the melt after desired time, are displayed at the end of the test.

As described herein, the polymer composition may comprise two or more (e.g., three, four, five, six) polymer components. For instance, in some embodiments, a polymer composition may comprise a first polymer component and a second polymer component. In other instances, a polymer composition may comprise a first, second, and third polymer component. For example, a polymer composition may comprise a first, second, and third polymer component selected to achieve a desired melt flow index and average molecular weights. The first polymer component may have a melt flow index greater than or equal to about 25 g/10 minutes and less than or equal to about 1,000 g/10 minutes (e.g., greater than or equal to about 300 g/10 minutes and less than or equal to about 700 g/10 minutes), a $M_n$ greater than or equal to about 35,000 g/mol and less than or equal to about 75,000 g/mol (e.g., greater than or equal to about 45,000 g/mol and less than or equal to about 65,000 g/mol), a $M_z$ greater than or equal to about 100,000 g/mol and less than or equal to about 150,000 g/mol (e.g., greater than or equal to about 115,000 g/mol and less than or equal to about 140,000 g/mol), and a $M_w$ greater than or equal to about 60,000 g/mol and less than or equal to about 95,000 g/mol (e.g., greater than or equal to about 70,000 g/mol and less than or equal to about 90,000 g/mol).

The second polymer component may have a melt flow index of greater than or equal to about 500 g/10 minutes and less than or equal to about 2,000 g/10 minutes (e.g., greater than or equal to about 800 g/10 minutes and less than or equal to about 1,600 g/10 minutes), a $M_n$ greater than or equal to about 15,000 g/mol and less than or equal to about 65,000 g/mol (e.g., greater than or equal to about 20,000 g/mol and less than or equal to about 60,000 g/mol), a $M_z$ greater than or equal to about 80,000 g/mol and less than or equal to about 140,000 g/mol (e.g., greater than or equal to about 90,000 g/mol and less than or equal to about 130,000 g/mol), and a $M_w$ greater than or equal to about 45,000 g/mol and less than or equal to about 90,000 g/mol (e.g., greater than or equal to about 55,000 g/mol and less than or equal to about 80,000 g/mol).

The third polymer component may have melt flow index of greater than or equal to about 800 g/10 minutes and less than or equal to about 3,000 g/10 minutes (e.g., greater than or equal to about 1,300 g/10 minutes and less than or equal to about 2,500 g/10 minutes), a $M_n$ greater than or equal to about 5,000 g/mol and less than or equal to about 60,000 g/mol (e.g., greater than or equal to about 10,000 g/mol and less than or equal to about 50,000 g/mol), a $M_z$ greater than or equal to about 55,000 g/mol and less than or equal to about 135,000 g/mol (e.g., greater than or equal to about 65,000 g/mol and less than or equal to about 125,000 g/mol), and a $M_w$ greater than or equal to about 30,000 g/mol and less than or equal to about 85,000 g/mol (e.g., greater than or equal to about 35,000 g/mol and less than or equal to about 75,000 g/mol).

In general, the polymer composition may comprise any suitable number of polymer components.

A polymer component in the polymer composition may have a certain molecular weight distribution and/or melt flow index. Non-limiting examples of average molecular weights and melt flow indices for a first, a second, and a third polymer component are described below. It should be understood that the following ranges are exemplary and other possible ranges of average molecular weights and/or melt flow index for a polymer component in the polymer composition are also possible. Additionally, it should be appreciated that the terms "first", "second", and "third" polymer component, as used herein, to refer to different possible polymer components having the above noted characteristics within the polymer composition, and are not meant to be limiting with respect to their inclusion in the polymer composition or the manner in which they are included. Furthermore, in some embodiments, additional polymer components (e.g., "fourth", "fifth", "sixth", or "seventh" components) may be present in addition to the ones described below.

In some embodiments, a first polymer component may have a melt flow index of greater than or equal to about 25 g/10 minutes, greater than or equal to about 50 g/10 minutes, greater than or equal to about 100 g/10 minutes, greater than or equal to about 200 g/10 minutes, greater than or equal to about 300 g/10 minutes, greater than or equal to about 400 g/10 minutes, greater than or equal to about 500 g/10 minutes, greater than or equal to about 600 g/10 minutes, greater than or equal to about 700 g/10 minutes, greater than or equal to about 800 g/10 minutes, or greater than or equal to about 900 g/10 minutes. In some instances, the first polymer component may have a melt flow index of less than or equal to about 1000 g/10 minutes, less than or equal to about 900, less than or equal to about 800 g/10 minutes, less than or equal to about 700 g/10 minutes, less than or equal to about 600 g/10 minutes, less than or equal to about 500 g/10 minutes, less than or equal to about 400 g/10 minutes, less than or equal to about 300 g/10 minutes, less than or equal to about 200 g/10 minutes, or less than or equal to about 100 g/10 minutes. It should be understood that all combinations of the above-referenced ranges are possible (e.g., greater than or equal to about 25 g/10 minutes and less than or equal to about 1,000 g/10 minutes, greater than or equal to about 300 g/10 minutes and less than or equal to about 700 g/10 minutes). Other values of melt flow index of the first polymer component are also possible.

In some embodiments, the number average molecular weight ($M_n$) of the first polymer component may be greater than or equal to about 35,000 g/mol, greater than or equal to about 40,000 g/mol, greater than or equal to about 45,000 g/mol, greater than or equal to about 50,000 g/mol, greater than or equal to about 55,000 g/mol, greater than or equal to about 60,000 g/mol, greater than or equal to about 65,000 g/mol, or greater than or equal to about 70,000 g/mol. In some instances, the number average molecular weight of the first polymer component may be less than or equal to about 75,000 g/mol, less than or equal to about 70,000 g/mol, less than or equal to about 65,000 g/mol, less than or equal to about 60,000 g/mol, less than or equal to about 55,000 g/mol, less than or equal to about 50,000 g/mol, less than or equal to about 45,000 g/mol, or less than or equal to about 40,000 g/mol. It should be understood that all combinations of the above-referenced ranges are possible (e.g., greater than or equal to about 45,000 g/mol and less than or equal to about 65,000 g/mol, greater than or equal to about 35,000 g/mol and less than or equal to about 75,000 g/mol). Other values of number average molecular weight are possible.

In some embodiments, the Z-average molecular weight ($M_z$) of the first polymer component may be greater than or equal to about 100,000 g/mol, greater than or equal to about 105,000 g/mol, greater than or equal to about 110,000 g/mol, greater than or equal to about 115,000 g/mol, greater than or equal to about 120,000 g/mol, greater than or equal to about 125,000 g/mol, greater than or equal to about 130,000 g/mol, greater than or equal to about 135,000 g/mol, greater than or equal to about 140,000 g/mol, or greater than or equal to about 145,000 g/mol. In some instances, Z-average molecular weight of the first polymer component may be less than or equal to about 150,000 g/mol, less than or equal to about 145,000 g/mol, less than or equal to about 140,000 g/mol, less than or equal to about 135,000 g/mol, less than or equal to about 130,000 g/mol, less than or equal to about 125,000 g/mol, less than or equal to about 120,000 g/mol, less than or equal to about 115,000 g/mol, less than or equal to about 110,000 g/mol, or less than or equal to about 105,000 g/mol. It should be understood that all combinations of the above-referenced ranges are possible (e.g., greater than or equal to about 115,000 g/mol and less than or equal to about 140,000 g/mol, greater than or equal to about 100,000 g/mol and less than or equal to about 150,000 g/mol). Other values of Z-average molecular weight are also possible.

In some embodiments, the weight average molecular weight ($M_w$) of the first polymer component may be greater than or equal to about 60,000 g/mol, greater than or equal to about 65,000 g/mol, greater than or equal to about 70,000 g/mol, greater than or equal to about 75,000 g/mol, greater than or equal to about 80,000 g/mol, greater than or equal to about 85,000 g/mol, or greater than or equal to about 90,000 g/mol. In some instances, the weight average molecular weight of the first polymer component may be less than or equal to about 95,000 g/mol, less than or equal to about 90,000 g/mol, less than or equal to about 85,000 g/mol, less than or equal to about 80,000 g/mol, less than or equal to about 75,000 g/mol, less than or equal to about 70,000 g/mol, or less than or equal to about 65,000 g/mol. It should be understood that all combinations of the above-referenced ranges are also possible (e.g., greater than or equal to about 70,000 g/mol and less than or equal to about 90,000 g/mol, greater than or equal to about 60,000 g/mol and less than or equal to about 95,000 g/mol). Other values of weight average molecular weight are also possible.

The weight percentage of the polymer components in the polymer composition may be selected to achieve the desired overall molecular weight distribution and/or melt flow index. For instance, in some embodiments, the weight percentage of the first polymer component in a polymer composition may be greater than or equal to about 1%, greater than or equal to about 5%, greater than or equal to about 10%, greater than or equal to about 15%, greater than or equal to about 20%, greater than or equal to about 25%, or greater than or equal to about 30%. In some instances, the weight percentage of the first polymer component in the composition may be less than or equal to about 35%, less than or equal to about 30%, less than or equal to about 25%, less than or equal to about 20%, less than or equal to 15%, less than or equal to about 10%, or less than or equal to about 5%. It should be understood that all combinations of the above-referenced ranges are possible (e.g., greater than or equal to about 5% and less than or equal to about 20%, greater than or equal to about 1% and less than or equal to about 35%). Other values of weight percentage of the first polymer component are also possible. For instance, in some embodiments, the weight percentage of the first polymer component of the polymer composition may be 0%.

In some embodiments, a second polymer component may have a melt flow index of greater than or equal to about 500 g/10 minutes, greater than or equal to about 650 g/10 minutes, greater than or equal to about 800 g/10 minutes, greater than or equal to about 1,000 g/10 minutes, greater than or equal to about 1,200 g/10 minutes, greater than or equal to about 1,400 g/10 minutes, greater than or equal to about 1,600 g/10 minutes, or greater than or equal to about 1,800 g/10 minutes In some instances, the second polymer component may have a melt flow index of less than or equal to about 2,000 g/10 minutes, less than or equal to about 1,800, less than or equal to about 1,600 g/10 minutes, less than or equal to about 1,400 g/10 minutes, less than or equal to about 1,200 g/10 minutes, less than or equal to about 1,000 g/10 minutes, less than or equal to about 800 g/10 minutes, or less than or equal to about 600 g/10 minutes. It should be understood that all combinations of the above-referenced ranges are possible (e.g., greater than or equal to about 800 g/10 minutes and less than or equal to about 1,600 g/10 minutes, greater than or equal to about 500 g/10 minutes and less than or equal to about 2,000 g/10 minutes). Other values of melt flow index of the second polymer component are also possible.

In some embodiments, the number average molecular weight ($M_n$) of the second polymer component may be greater than or equal to about 15,000 g/mol, greater than or greater than or equal to about 25,000 g/mol, greater than or equal to about 30,000 g/mol, greater than or equal to about 35,000 g/mol, greater than or equal to about 40,000 g/mol, greater than or equal to about 45,000 g/mol, greater than or equal to about 50,000 g/mol, greater than or equal to about 55,000 g/mol, or greater than or equal to about 60,000 g/mol. In some instances, the number average molecular weight of the second polymer component may be less than or equal to about 65,000 g/mol, less than or equal to about 60,000 g/mol, less than or equal to about 50,000 g/mol, less than or equal to about 45,000 g/mol, less than or equal to about 40,000 g/mol, less than or equal to about 35,000 g/mol, less than or equal to about 25,000 g/mol, or less than or equal to about 20,000 g/mol. It should be understood that all combinations of the above-referenced ranges are possible (e.g., greater than or equal to about 20,000 g/mol and less than or equal to about 60,000 g/mol, greater than or equal to about 15,000 g/mol and less than or equal to about 65,000 g/mol). Other values of number average molecular weight are possible.

In some embodiments, the Z-average molecular weight ($M_z$) of the second polymer component may be greater than or equal to about 80,000 g/mol, greater than or equal to about 90,000 g/mol, greater than or equal to about 100,000 g/mol, greater than or equal to about 110,000 g/mol, greater than or equal to about 120,000 g/mol, or greater than or equal to about 130,000 g/mol. In some instances, the number average molecular weight of the second polymer component may be less than or equal to about 140,000 g/mol, less than or equal to about 130,000 g/mol, less than or equal to about 120,000 g/mol, less than or equal to about 110,000 g/mol, less than or equal to about 100,000 g/mol, or less than or equal to about 90,000 g/mol. It should be understood that all combinations of the above-referenced ranges are possible (e.g., greater than or equal to about 90,000 g/mol and less than or equal to about 130,000 g/mol, greater than or equal to about 80,000 g/mol and less than or equal to about 140,000 g/mol). Other values of Z-average molecular weight are also possible.

In some embodiments, the weight average molecular weight ($M_w$) of the second polymer component may be greater than or equal to about 45,000 g/mol, greater than or equal to about 50,000 g/mol, greater than or equal to about 55,000 g/mol, greater than or equal to about 60,000 g/mol, greater than or equal to about 65,000 g/mol, greater than or equal to about 70,000 g/mol, greater than or equal to about 75,000 g/mol, greater than or equal to about 80,000 g/mol, or greater than or equal to about 85,000 g/mol. In some instances, the weight average molecular weight of the second polymer component may be less than or equal to about 90,000 g/mol, less than or equal to about 85,000 g/mol, less than or equal to about 80,000 g/mol, less than or equal to about 75,000 g/mol, less than or equal to about 70,000 g/mol, less than or equal to about 65,000 g/mol, less than or equal to about 60,000 g/mol, less than or equal to about 55,000 g/mol, or less than or equal to about 50,000 g/mol. It should be understood that all combinations of the above-referenced ranges are also possible (e.g., greater than or equal to about 55,000 g/mol and less than or equal to about 80,000 g/mol, greater than or equal to about 45,000 g/mol and less than or equal to about 90,000 g/mol). Other values of weight average molecular weight are also possible.

In some embodiments, the weight percentage of the second polymer component in a polymer composition may be greater than or equal to about 1%, greater than or equal to about 5%, greater than or equal to about 10%, greater than or equal to about 15%, greater than or equal to about 20%, greater than or equal to about 25%, greater than or equal to about 30%, greater than or equal to about 35%, greater than or equal to about 40%, or greater than or equal to about 45%. In some instances, the weight percentage of the second polymer component in the composition may be less than or equal to about 50%, less than or equal to about 45%, less than or equal to about 40%, less than or equal to about 35%, less than or equal to about 30%, less than or equal to about 25%, less than or equal to about 20%, less than or equal to about 15%, less than or equal to about 10%, less than or equal to about 5%. It should be understood that all combinations of the above-referenced ranges are also possible (e.g., greater than or equal to about 20% and less than or equal to about 40%, greater than or equal to about 1% and less than or equal to about 50%). Other values of weight percentage of the second polymer component are also possible. For instance, in some embodiments, the weight percentage of the second polymer component of the polymer composition may be 0%.

In some embodiments, a third polymer component may have a melt flow index of greater than or equal to about 800 g/10 minutes, greater than or equal to about 1,300 g/10 minutes, greater than or equal to about 1,500 g/10 minutes, greater than or equal to about 1,700 g/10 minutes, greater than or equal to about the 1,900 g/10 minutes, greater than or equal to about 2,100 g/10 minutes, greater than or equal to about 2,300 g/10 minutes, greater than or equal to about 2,500 g/10 minutes, greater than or equal to about 2,700 g/10 minutes, or greater than or equal to about 2,900 g/10 minutes. In some instances, the third polymer component may have a melt flow index of less than or equal to about 3,000 g/10 minutes, less than or equal to about 2,800, less than or equal to about 2,500 g/10 minutes, less than or equal to about 2,400 g/10 minutes, less than or equal to about 2,200 g/10 minutes, less than or equal to about 2,000 g/10 minutes, less than or equal to about 1,800 g/10 minutes, less than or equal to about 1,600 g/10 minutes, less than or equal to about 1,400 g/10 minutes, less than or equal to about 1,200 g/10 minutes, or less than or equal to about 1,000 g/10 minutes. It should be understood that all combinations of the above-referenced ranges are possible (e.g., greater than or equal to about 1,300 g/10 minutes and less than or equal to about 2,500 g/10 minutes, greater than or equal to about 800 g/10 minutes and less than or equal to about 3,000 g/10 minutes). Other values of melt flow index of the third polymer component are also possible.

In some embodiments, the number average molecular weight ($M_n$) of the third polymer component may be greater than or equal to about 5,000 g/mol, greater than or greater than or equal to about 10,000 g/mol, greater than or equal to about 15,000 g/mol, greater than or equal to about 20,000 g/mol, greater than or equal to about 25,000 g/mol, greater than or equal to about 30,000 g/mol, greater than or equal to about 35,000 g/mol, greater than or equal to about 40,000 g/mol, greater than or equal to about 45,000 g/mol, greater than or equal to about 50,000 g/mol, or greater than or equal to about 55,000 g/mol. In some instances, the number average molecular weight of the third polymer component may be less than or equal to about 60,000 g/mol, less than or equal to about 55,000 g/mol, less than or equal to about 45,000 g/mol, less than or equal to about 40,000 g/mol, less than or equal to about 30,000 g/mol, less than or equal to about 25,000 g/mol, less than or equal to about 20,000 g/mol, less than or equal to about 15,000 g/mol, or less than or equal to about 10,000 g/mol. It should be understood that all combinations of the above-referenced ranges are possible (e.g., greater than or equal to about 10,000 g/mol and less than or equal to about 50,000 g/mol, greater than or equal to about 5,000 g/mol and less than or equal to about 60,000 g/mol). Other values of number average molecular weight are possible.

In some embodiments, the Z-average molecular weight ($M_z$) of the third polymer component may be greater than or equal to about 55,000 g/mol, greater than or equal to about 65,000 g/mol, greater than or equal to about 75,000 g/mol, greater than or equal to about 85,000 g/mol, greater than or equal to about 95,000 g/mol, greater than or equal to about 105,000 g/mol, greater than or equal to about 115,000 g/mol, or greater than or equal to about 125,000 g/mol. In some instances, the number average molecular weight of the third polymer component may be less than or equal to about 135,000 g/mol, less than or equal to about 125,000 g/mol, less than or equal to about 115,000 g/mol, less than or equal to about 105,000 g/mol, less than or equal to about 95,000 g/mol, less than or equal to about 85,000 g/mol, less than or equal to about 75,000 g/mol, or less than or equal to about 65,000 g/mol. It should be understood that all combinations of the above-referenced ranges are possible (e.g., greater than or equal to about 65,000 g/mol and less than or equal to about 125,000 g/mol, greater than or equal to about 55,000 g/mol and less than or equal to about 135,000 g/mol). Other values of Z-average molecular weight are also possible.

In some embodiments, the weight average molecular weight ($M_w$) of the third polymer component may be greater than or equal to about 30,000 g/mol, greater than or equal to about 35,000 g/mol, greater than or equal to about 40,000 g/mol, greater than or equal to about 45,000 g/mol, greater than or equal to about 50,000 g/mol, greater than or equal to about 55,000 g/mol, greater than or equal to about 60,000 g/mol, greater than or equal to about 65,000 g/mol, greater than or equal to about 70,000 g/mol, greater than or equal to about 75,000 g/mol, greater than or equal to about 80,000 g/mol, or greater than or equal to about 85,000 g/mol. In some instances, the weight average molecular weight of the third polymer component may be less than or equal to about 90,000 g/mol, less than or equal to about 85,000 g/mol, less than or equal to about 80,000 g/mol, less than or equal to about 75,000 g/mol, less than or equal to about 70,000 g/mol, less than or equal to about 65,000 g/mol, less than or equal to about 60,000 g/mol, less than or equal to about 55,000 g/mol, less than or equal to about 50,000 g/mol, less than or equal to about 45,000 g/mol, or less than or equal to about 40,000 g/mol. It should be understood that all combinations of the above-referenced ranges are possible (e.g., greater than or equal to about 55,000 g/mol and less than or equal to about 80,000 g/mol, greater than or equal to about 30,000 g/mol and less than or equal to about 90,000 g/mol). Other values of weight average molecular weight are also possible.

In some embodiments, the weight percentage of the third polymer component in a polymer composition may be greater than or equal to about 1%, greater than or equal to about 10%, greater than or equal to about 20%, greater than or equal to about 30%, greater than or equal to about 40%, greater than or equal to about 50%, greater than or equal to about 60%, or greater than or equal to about 70%. In some instances, the weight percentage of the third polymer component in the composition may be less than or equal to about 80%, less than or equal to about 70%, less than or equal to about 60%, less than or equal to about 50%, less than or equal to about 40%, less than or equal to about 30%, less than or equal to about 20%, or less than or equal to about 10%. It should be understood that all combinations of the above-referenced ranges are possible (e.g., greater than or equal to about 30% and less than or equal to about 70%, greater than or equal to about 1% and less than or equal to about 80%). Other values of weight percentage of the third polymer component are also possible. For instance, in some embodiments, the weight percentage of the third polymer component of the polymer composition may be 0%.

In some embodiments, the polymer components in the polymer composition may be selected such that the melt flow index of each component (e.g., a polypropylene component) in the composition is above a certain threshold value (e.g., greater than or equal to about 25 g/10 minutes, greater than or equal to about 50 g/10 minutes, or greater than or equal to a melt flow index value described herein for any of the first, second or third components).

In some embodiments, a fiber web formed from the polymer composition may comprise fibers having a relatively small average diameter. For instance, in some embodiments, the average diameter of the fibers in the fiber web may be greater than or equal to about 0.1 microns, greater than or equal to about 0.2 microns, greater than or equal to about 0.4 microns, greater than or equal to about 0.6 microns, greater than or equal to about 0.8 microns, greater than or equal to about 1 micron, greater than or equal to about 2 microns, greater than or equal to about 4 microns, greater than or equal to about 6 microns, or greater than or equal to about 8 microns. In some instances, the average diameter of the fibers in the fiber web may be less than or equal to about 10 microns, less than or equal to about 8 microns, less than or equal to about 6 microns, less than or equal to about 4 microns, less than or equal to about 2 microns, less than or equal to about 1 microns, less than or equal to about 0.8 microns, less than or equal to about 0.6 microns, less than or equal to about 0.4 microns, or less than or equal to about 0.2 microns. It should be understood that all combinations of the above-referenced ranges are possible (e.g., greater than or equal to about 0.1 microns and less than or equal to about 1 micron, greater than or equal to about 0.1 microns and less than or equal to about 10 microns). Other values of average fiber diameter are also possible. As used herein, fiber diameter is measured using scanning electron microscopy techniques.

In some embodiments, a fiber web formed from the polymer composition may have a relatively low amount of process defects. Without wishing to be bound by any theory, it is believed that subjecting the polymer composition used to form the fibers to relatively high temperatures and pressures for extended periods of time in an extrusion system can cause the polymer composition to degrade. Degradation may involve chain scission, i.e., shortening of the polymer chains to produce lower molecular weight polymers, and/or other forms of decomposition (e.g., chemical decomposition, thermal decomposition, ionization). As a result of polymer degradation, small polymeric particles may be formed. These particles may have the same chemical composition as the polymer composition used to form the fibers (but having a lower molecular weight), or may be a derivative of the polymer composition used to form the fibers. The particles may be associated with the fiber web in various configurations. For instance, the particles may reside on the surface of the fibers, on the surface of the fiber web, in the center of the fiber web, or in combinations thereof.

The shape and size of the polymeric particles formed may vary, and in some cases, the particles can even agglomerate to form larger particles. It should be understood that the polymeric particles described herein are different from fibers. The polymeric particles are non-fibrous, and generally have an aspect ratio (i.e., a length to largest cross-sectional dimension) of less than 50:1 and a largest cross-sectional dimension of at least 0.2 mm. For instance, in some embodiments, a particle may have a largest cross-sectional dimension of less than or equal to about 10 mm, less than or equal to about 8 mm, less than or equal to about 6 mm, less than or equal to about 4 mm, less than or equal to about 2 mm, less than or equal to about 1 mm, or less than or equal to about 0.5 mm. In some instances, a particle may have a largest cross-sectional dimension of greater than or equal to about 0.2 mm, greater than or equal to about 0.5 mm, greater than or equal to about 1.0 mm, greater than or equal to about 2.0 mm, greater than or equal to about 4.0 mm, greater than or equal to about 6.0 mm, greater than or equal to about 8.0 mm. It should be understood that all combinations of the above-referenced ranges are possible (e.g., greater than or equal to about 0.2 mm and less than or equal to about 10 mm). Other values and ranges of particle size are also possible.

In certain embodiments, the number average molecular weight of the particles formed during a fiber extrusion process may be less than or equal to about ½ the number average molecular weight of the polymer used to form the fibers. For instance, the number average molecular weight of the particles formed during a fiber extrusion process may be less than or equal to about ⅛, less than or equal to about 1/64, or less than or equal to about 1/200 the number average molecular weight of the polymer used to form the fibers. Other values of molecular weight of the particles associated with a fiber web are also possible.

In some embodiments, a fiber web as described herein may include a relatively low number of or essentially no particles on its surface. The amount of particles may be measured by determining the surface density of particles on the fiber web, i.e., the number of particles on a surface of the fiber web per unit area of the fiber web surface. For instance, a fiber web may have a surface density of particles of less than or equal to about 12.0 particles/inch$^2$, less than or equal to about 10.0 particles/inch$^2$, less than or equal to about 8.0 particles/inch$^2$, less than or equal to about 6.0 particles/inch$^2$, less than or equal to about 4.0 particles/inch$^2$, less than or equal to about 2.5 particles/inch$^2$, less than or equal to about 2.2 particles/inch$^2$, less than or equal to about 2.0 particles/inch$^2$, less than or equal to about 1.8 particles/inch$^2$, less than or equal to about 1.6 particles/inch$^2$, less than or equal to about 1.5 particles/inch$^2$, less than or equal to about 1.3 particles/inch$^2$, less than or equal to about 1.0 particles/inch$^2$, less than or equal to about 0.8 particles/inch$^2$, less than or equal to about 0.5 particles/inch$^2$, or less than or equal to about 0.3 particles/inch$^2$, wherein each of the particles has a largest cross-sectional dimension of one of the ranges or values described above. For example, in one particular embodiment, a fiber web has a surface density of particles of less than or equal to about 3.0 particles/inch$^2$, wherein each of the particles has a largest cross-sectional dimension of about 0.2 mm or greater. In this embodiment, even though the fiber web may include some particles having a largest cross-sectional dimension smaller than about 0.2 mm, these particles are not accounted for in calculating the surface density of particles. In another embodiment, a fiber web has a surface density of particles of less than or equal to about 3.0 particles/inch$^2$, wherein each of the particles has a largest cross-sectional dimension of about 1.0 mm or greater. In this embodiment, even though the fiber web may include some particles having a largest cross-sectional dimension smaller than about 1.0 mm, these particles are not accounted for in calculating the surface density of particles. Other surface densities of particles in a particular size range or value are also possible.

The number of particles per unit area of fiber web can be determined as follows. A sample of fiber web can be layered together with carbon paper and a white sheet of standard copy paper, where the carbon paper is positioned between the fiber web and the copy paper. The composite structure can be placed in a continuous belt press where the following conditions are employed: a line speed of 2.5 m/min, a pressure of 6 bars, and a temperature of about 68° F.-80° F. (room temperature). After exposure to these conditions, the degraded polymer particles, if present, may lie at an elevated position compared to the fibers, and appear as small "dots" on the underlying copy paper. If a darker image is needed for detection, the copy paper can be photocopied with a standard copier to darken the carbon image. This copy paper image can be scanned using standard imaging software, and software (e.g., ImageJ software available for download at http://rsbweb.nih.gov/ij/) can be used to determine the number of "dots" on the image. These "dots" may be measured in pixels, and each pixel can be correlated to a certain size to determine the size and number of particles. For instance, 1 pixel may correspond to 0.2646 mm, so a "dot" having a size of 1 pixel on the image may correspond to 1 particle having a largest dimension of 0.2646 mm; a "dot" having a size of 4 pixels on the image may correspond to 1 particle having a largest dimension of 1.1 mm. Pixel sizes may vary depending on the imaging hardware and/or software used. To calculate a surface density of particles, wherein each of the particles has a largest cross-sectional dimension of, for example, about 1.0 mm or greater, only the "dots" having a size of at least 4 pixels (e.g., a largest cross-sectional dimension of about 1.0 mm or greater) would be counted. This number would be divided by the area of the fiber web used for counting the particles to determine the surface density of particles. In this particular instance, even though the fiber web may include some particles having a largest cross-sectional dimension smaller than about 1.0 mm, these particles are not accounted for the purpose of this particular calculation.

In some embodiments, fiber webs having a value or range of surface density of particles described above can also have one or more of the values and ranges of the features and performance characteristics described below.

In certain embodiments, the fiber webs described herein may have a relatively high surface area. For instance, in some embodiments, a fiber web may have a surface area of greater than or equal to about 0.1 m$^2$/g, greater than or equal to about 0.5 m$^2$/g, greater than or equal to about 1 m$^2$/g, greater than or equal to about 1.5 m$^2$/g, greater than or equal to about 2.0 m$^2$/g, greater than or equal to about 2.5 m$^2$/g, greater than or equal to about 3.0 m$^2$/g, greater than or equal to about 3.5 m$^2$/g, greater than or equal to about 4.0 m$^2$/g, greater than or equal to about 4.5 m$^2$/g, greater than or equal to about 5.0 m$^2$/g, or greater than or equal to 5.5 m$^2$/g. In some instances, a fiber web may have a surface area of less than or equal to about 6.0 m²/g, less than or equal to about 5.5 m²/g, less than or equal to about 5.0 m²/g, less than or equal to about 4.5 m²/g, less than or equal to about 4.0 m²/g, less than or equal to about 3.5 m²/g, less than or equal to about 3.0 m²/g, less than or equal to about 2.5 m²/g, less than or equal to about 2.0 m²/g, less than or equal to about 2.0 m²/g, less than or equal to about 1.5 m²/g, less than or equal to about 1.0 m²/g, or less than or equal to about 0.5 m²/g. It should be understood that all combinations of the above-reference ranges are possible (e.g., greater than or equal to about 1.5 m²/g and less than or equal to about 6.0 m²/g, greater than or equal to about 0.1 m²/g and less than or equal to about 6.0 m²/g)

As determined herein, surface area is measured through use of a standard BET surface area measurement technique. The BET surface area is measured according to section 10 of Battery Council International Standard BCIS-03A, "Recommended Battery Materials Specifications Valve Regulated Recombinant Batteries", section 10 being "Standard Test Method for Surface Area of Recombinant Battery Separator Mat". Following this technique, the BET surface area is measured via adsorption analysis using a BET surface analyzer (e.g., Micromeritics Gemini III 2375 Surface Area Analyzer) with nitrogen gas; the sample amount is between 0.5 and 0.6 grams in a ¾" tube; and, the sample is allowed to degas at 75 degrees C. for a minimum of 3 hours.

In some embodiments, the fiber web may have a mean flow pore size of greater than or equal to about 1 micron, greater than or equal to about 3 microns, greater than or equal to about 5 microns, greater than or equal to about 8 microns, greater than or equal to about 10 microns, greater than or equal to about 12 microns, greater than or equal to about 15 microns, greater than or equal to about 20 microns, or greater than or equal to about 25 microns. In some instances, the mean flow pore size of the fiber web may be less than or equal to about 30 microns, less than or equal to about 25 microns, less than or equal to about 15 microns, less than or equal to about 12 microns, less than or equal to about 10 microns, less than or equal to about 8 microns, less than or equal to about 6 microns, less than or equal to about 4 microns, or less than or equal to about 2 microns. It should be understood that all combinations of the above-reference ranges are possible (e.g., greater than or equal to about 5 microns and less than or equal to about 15 microns, greater than or equal to about 1 microns and less than or equal to about 30 microns). Other values and ranges of mean flow pore size are also possible. As used herein, mean flow pore size is measured according to the standard ASTM F-316-80 Method B, BS6410, e.g., using a Capillary Flow Porometer made by Porous Materials Inc.

The basis weight of the fiber web can typically be selected for a given application as desired. For instance, in some embodiments, the basis weight of the fiber web may be greater than or equal to about 0.5 g/m², greater than or equal to about 1 g/m², greater than or equal to about 2 g/m², greater than or equal to about 3 g/m², greater than or equal to about 5 g/m², greater than or equal to about 10 g/m², greater than or equal to about 20 g/m², greater than or equal to about 30 g/m², greater than or equal to about 40 g/m², greater than or equal to about 50 g/m², greater than or equal to about 60 g/m², greater than or equal to about 70 g/m², greater than or equal to about 80 g/m², or greater than or equal to about 90 g/m². In some instances, the basis weight of the fiber web may less than or equal to about 100 g/m², less than or equal to about 90 g/m², less than or equal to about 80 g/m², less than or equal to about 70 g/m², less than or equal to about 60 g/m², less than or equal to about 50 g/m², less than or equal to about 40 g/m², less than or equal to about 30 g/m², less than or equal to about 20 g/m², less than or equal to about 10 g/m², less than or equal to about 5 g/m², less than or equal to about 2 g/m², or less than or equal to about 1 g/m². It should be understood that all combinations of the above-reference ranges are possible (e.g., greater than or equal to about 3 g/m² and less than or equal to about 30 g/m², greater than or equal to about 0.5 g/m² and less than or equal to about 100 g/m²). Other values of basis weight are also possible. As referred to herein, basis weight is determined according to ASTM D3776.

In certain embodiments, the fiber webs described herein have a relatively high consistency (low variability) of basis weight across the fiber web. For instance, the variability of basis weight across the fiber web may be less than or equal to about 6.0 standard deviations, less than or equal to about 5.5 standard deviations, less than or equal to about 5.0 standard deviations, less than or equal to about 4.5 standard deviations, less than or equal to about 4.0 standard deviations, less than or equal to about 3.5 standard deviations, less than or equal to about 3.0 standard deviations, less than or equal to about 2.5 standard deviations, less than or equal to about 2.0 standard deviations, less than or equal to about 1.5 standard deviations, less than or equal to about 1.0 standard deviations, or less than or equal to about 0.5 standard deviations. Other values of basis weight variability are also possible. The variability of basis weight may be determined by taking a statistically significant number of measurements across the fiber web.

The fiber web can generally have any suitable thickness. In some embodiments, the fiber web has a thickness of greater than or equal to about 0.0005 inches, greater than or equal to about 0.001 inches, greater than or equal to about 0.002 inches, greater than or equal to about 0.004 inches, greater than or equal to about 0.006 inches, greater than or equal to about 0.008 inches, greater than or equal to about 0.01 inches, or greater than or equal to about 0.02 inches. In some instances, the thickness of the fiber web may be less than or equal to about 0.04 inches, less than or equal to about 0.02 inches, less than or equal to about 0.01 inches, less than or equal to about 0.008 inches, less than or equal to about 0.006 inches, less than or equal to about 0.004 inches, less than or equal to about 0.002 inches, or less than or equal to about 0.001 inches. It should be understood that all combination of the above-reference ranges are possible (e.g., greater than or equal to about 0.002 inches and less than or equal to about 0.01 inches, greater than or equal to about 0.0005 inches and less than or equal to about 0.04 inches). Other values of thickness of the fiber web are also possible. As referred to herein, thickness is determined according to the standard ASTM D1777.

In certain embodiments, the fiber webs described herein have a relatively high consistency (low variability) of thickness across the fiber web. For instance, the variability of thickness across the fiber web may be less than or equal to about 6.0 standard deviations, less than or equal to about 5.5 standard deviations, less than or equal to about 5.0 standard deviations, less than or equal to about 4.5 standard deviations, less than or equal to about 4.0 standard deviations, less than or equal to about 3.5 standard deviations, less than or equal to about 3.0 standard deviations, less than or equal to about 2.5 standard deviations, less than or equal to about 2.0 standard deviations, less than or equal to about 1.5 standard deviations, less than or equal to about 1.0 standard deviations, or less than or equal to about 0.5 standard deviations. Other values of thickness variability are also possible. The variability of thickness may be determined by taking a statistically significant number of measurements across the fiber web.

In some embodiments, fiber webs described herein may vary based on the air permeability ranges described herein. For instance, in some embodiments, the air permeability of a fiber web may be less than or equal to about 3,000 ft$^3$/min/ft$^2$ (CFM), less than or equal to about 2,750 CFM, less than or equal to about 2,500 CFM, less than or equal to about 2,250 CFM, less than or equal to about 2,000 CFM, less than or equal to about 1,750 CFM, less than or equal to about 1,500 CFM, less than or equal to about 1,250 CFM, less than or equal to about 1000 CFM, less than or equal to about 750 CFM, less than or equal to about 500 CFM, less than or equal to about 250 CFM, less than or equal to about 100 CFM, less than or equal to about 50 CFM, less than or equal to about 25 CFM, less than or equal to about 10 CFM, or less than or equal to about 5 CFM. In some instances, the air permeability of the fiber web may be greater than or equal to about 2 CFM, greater than or equal to about 5 CFM, greater than or equal to about 10 CFM, greater than or equal to about 25 CFM, greater than or equal to about 50 CFM, greater than or equal to about 100 CFM, greater than or equal to 250 CFM, greater than or equal to about 500 CFM, greater than or equal to about 750 CFM, greater than or equal to about 1,000 CFM, greater than or equal to about 1,250 CFM, greater than or equal to about 1,500 CFM, greater than or equal to about 1,750 CFM, greater than or equal to about 2,000 CFM, greater than or equal to about 2,250 CFM, greater than or equal to about 2,500 CFM, or greater than or equal to about 2,750 CFM. It should be understood that all combinations of the above-referenced ranges are possible (e.g., greater than or equal to about 2 CFM and less than or equal to about 3000 CFM). Other ranges are also possible.

As used herein, air permeability is measured according to the standard ASTM D737-75. In the air permeability testing apparatus, the sample is clamped on to a test head which provides a circular test area of 38.3 cm$^2$ (or alternatively 5 cm$^2$, 6.45 cm$^2$ or 100 cm$^2$ depending on the air flow characteristics) referred to as nozzle, at a force of at least 50+/−5 N without distorting the sample and with minimum edge leakage. A steady flow of air perpendicular to the sample test area is then supplied providing a pressure differential of 12.5 mm H$_2$O across the material being tested (or alternatively between 10 and 250 mm H$_2$O depending on the air flow characteristics of the material). This pressure differential is recorded from the pressure gauge or manometer connected to the test head. The air velocity through the test area is measured in ft$^3$/min/ft$^2$ using a flow meter or volumetric counter. A Frazier air permeability tester is an example apparatus for such a measurement.

The fiber webs described herein may have different ranges of NaCl particle filtration efficiencies. The NaCl particle filtration efficiency is [1−(C/C$_O$)]*100%, where is the NaCl particle concentration after passage through the fiber web and C$_O$ is the NaCl particle concentration before passage through the filter. To measure NaCl particle filtration efficiency, a 100 cm$^2$ surface area of the fiber web can be tested with NaCl (sodium chloride) particles having a 0.26 micron mass mean diameter with a geometric standard deviation less than 1.83, a concentration of 15 to 20 mg/cm$^3$, and a face velocity of 5.3 cm/s by a TSI 8130 CertiTest™ automated filter testing unit from TSI, Inc. equipped with a sodium chloride generator. The instrument measures a pressure drop (e.g., an airflow resistance) across the fiber web and the resultant penetration value on an instantaneous basis at a flow rate less than or equal to 115 liters per minute (lpm). Instantaneous readings can be defined as 1 pressure drop/penetration measurement. This test is described in ASTM D2 986-91.

A fiber web described herein may have a NaCl particle filtration efficiency of greater than or equal to about 10%, greater than or equal to about 20%, greater than or equal to about 30%, greater than or equal to about 40%, greater than or equal to about 50%, greater than or equal to about 60%, greater than or equal to about 70%, greater than or equal to about 80%, greater than or equal to about 90%, greater than or equal to about 95%, greater than or equal to about 97%, greater than or equal to about 99%, greater than or equal to about 99.5%, greater than or equal to about 99.9%, greater than or equal to about 99.95%, greater than or equal to about 99.99%, or greater than or equal to about 99.995%. In some instances, the fiber web may have a NaCl particle filtration efficiency less than or equal to about 99.999%, less than or equal to about 99.99%, less than or equal to about 99.9%, less than or equal to about 99.5%, less than or equal to about 99%, less than or equal to about 98%, less than or equal to about 97%, less than or equal to about 95%, less than or equal to about 85%, less than or equal to about 75%, less than or equal to about 65%, less than or equal to about 55%, less than or equal to about 45%, less than or equal to about 35%, less than or equal to about 25%, or less than or equal to about 15%. It should be understood that all combinations of the above-referenced ranges are possible (e.g., greater than or equal to about 50% and less than or equal to about 99.999%, greater than or equal to about 10% and less than or equal to about 99.9%). Other ranges and values of NaCl particle filtration efficiency are also possible.

In some embodiments, a fiber web described herein may have an airflow resistance of greater than or equal to about 0.1 mm H$_2$O, greater than or equal to about 0.3 mm H$_2$O, greater than or equal to about 0.5 mm H$_2$O, greater than or equal to about 1 mm H$_2$O, greater than or equal to about 1.5 mm H$_2$O, greater than or equal to about 2 mm H$_2$O, greater than or equal to about 2.5 mm H$_2$O, greater than or equal to about 3 mm H$_2$O, greater than or equal to about 3.5 mm H$_2$O, greater than or equal to about 5 mm H$_2$O, greater than or equal to about 10 mm H$_2$O, greater than or equal to about 15 mm H$_2$O, greater than or equal to about 20 mm H$_2$O, greater than or equal to about 25 mm H$_2$O, greater than or equal to about 30 mm H$_2$O, greater than or equal to about 35 mm H$_2$O, greater than or equal to about 40 mm H$_2$O, or greater than or equal to about 45. In some instances, the air flow resistance may be less than or equal to about 50 mm H$_2$O, less than or equal to about 45 mm H$_2$O, less than or equal to about 40 mm H$_2$O, less than or equal to about 35 mm H$_2$O, less than or equal to about 30 mm H$_2$O, less than or equal to about 25 mm H$_2$O, less than or equal to about 20 mm H$_2$O, less than or equal to about 15 mm H$_2$O, less than or equal to about 10 mm H$_2$O, less than or equal to about 5 mm H$_2$O, less than or equal to about 3.5 mm H$_2$O, less than or equal to about 2 mm H$_2$O, or less than or equal to about 1 mm H$_2$O. It should be understood that all combination of the above-referenced ranges are possible (e.g., greater than or equal to about 0.3 mm H$_2$O and less than or equal to about 3.5 mm H$_2$O, greater than or equal to about 0.1 mm H$_2$O and less than or equal to about 50 mm H$_2$O). Other ranges and values of air flow resistance are also possible. As used herein, air flow resistance is measured according to the standard ASTM D2 986-91 as described above.

In some embodiments, the fiber web includes one or more additives such as a binder, a lubricant, a slip agent, a surfactant, a coupling agent, a crosslinking agent, amongst others. In certain instances, one or more additives can be used to reduce or eliminate the number of polymeric particles formed on or in a fiber web.

Generally, the fiber web includes a small weight percentage of an additive. For example, the fiber web may include less than or equal to about 10 wt. %, less than or equal to about 8 wt. %, less than or equal to about 6 wt. %, less than or equal to about 4 wt. %, less than or equal to about 2 wt. %, less than or equal to 1 wt. %, or less than or equal to about 0.5 wt. % of an additive. In some cases, the fiber web may include between about 0.1 wt. % and about 10 wt. %, between about 0.1 wt. % and about 8 wt. %, between about 0.1 wt. % and about 5 wt. % of an additive, or between about 0.1 wt. % and about 2.5 wt. % of an additive. In certain embodiments, the fiber web may include less than or equal to about 5 wt. %, less than or equal to about 3 wt. %, less than or equal to about 2 wt. %, or less than or equal to about 1 wt. % of a fatty acid additive as described below. In some embodiments, the additive may be added to the polymer material used to form the fibers when the polymeric material is in a molten (e.g., melted) state. In other embodiments, the additive coats the fibers after the fibers have been formed.

In some embodiments, the fiber web may include an additive (e.g., a slip agent or other type of additive) in the form of a lipid. In some cases, the additive comprises a fatty acid (e.g., a saturated fatty acid, an unsaturated fatty acid, a mono-unsaturated fatty acid, a poly-unsaturated fatty acid). In certain embodiments, the fatty acid includes an amide group (e.g., a fatty acid amide). Non-limiting examples of fatty acid amides include stearamide, behenamide, erucamide, n-(2-hydroxyethyl) erucamide, lauramide, N,N'-ethylene-bis-oleamide, N,N'-ethylene bissteamide, oleamide, oleyl palmitamide, stearyl erucamide, tallow amide, arachidonylethanolamide, n-arachidonoyl maleimide, mixtures thereof, and derivatives thereof.

In certain embodiments, the additive is in the form of a fatty acid having a $C_n$ (carbon) chain, where n is an integer. In some cases, n is 2 or greater, 4 or greater, 6 or greater, 8 or greater, 10 or greater, 12 or greater, 14 or greater, 16 or greater, 18 or greater, 20 or greater, 22 or greater, 24 or greater, 26 or greater, 28 or greater, 30 or greater, 32 or greater, 34 or greater, 36 or greater, 38 or greater, or 40 or greater. In other cases, n is less than or equal to 50, less than or equal to 45, less than or equal to 40, less than or equal to 35, less than or equal to 40, less than or equal to 35, less than or equal to 30, less than or equal to 25, less than or equal to 20, less than or equal to 15, less than or equal to 10, or less than or equal to 5.

In some embodiments, fibers formed from the polymer composition may have a certain molecular weight distribution. In some instances, one or more average molecular weights of the fibers may be similar to, substantially the same as, or greater than that of the polymer composition used to form the fibers. In certain conventional non-woven webs formed under similar conditions, one or more average molecular weights of the fibers is less than that of the polymer composition used to form fiber webs, due in part to degradation during web formation. For instance, fibers formed from a polymer composition containing two or more metallocene-catalyzed polypropylene components may have a certain average molecular weight similar to that of the corresponding polymer composition. Whereas, fibers formed from a polymer composition including a Ziegler-Natta catalyzed propylene may have a certain average molecular weight that is significantly lower than the corresponding polymer composition.

In some embodiments, the number average molecular weight ($M_n$) of fibers formed from the polymer composition may be greater than or equal to about 15,000 g/mol, greater than or equal to about 20,000 g/mol, greater than or equal to about 25,000 g/mol, greater than or equal to about 30,000 g/mol, greater than or equal to about 35,000 g/mol, greater than or equal to about 40,000 g/mol, greater than or equal to about 45,000 g/mol, greater than or equal to about 50,000 g/mol, greater than or equal to about 55,000 g/mol, greater than or equal to about 60,000 g/mol, greater than or equal to about 65,000 g/mol, or greater than or equal to about 70,000 g/mol. In some instances, the number average molecular weight of the fibers may be less than or equal to about 75,000 g/mol, less than or equal to about 70,000 g/mol, less than or equal to about 65,000 g/mol, less than or equal to about 60,000 g/mol, less than or equal to about 55,000 g/mol, less than or equal to about 50,000 g/mol, less than or equal to about 45,000 g/mol, less than or equal to about 40,000 g/mol, less than or equal to about 35,000 g/mol, less than or equal to about 30,000 g/mol, less than or equal to about 25,000 g/mol, or less than or equal to about 20,000 g/mol. It should be understood that all combinations of the above-referenced ranges are possible (e.g., greater than or equal to about 25,000 g/mol and less than or equal to about 50,000 g/mol, greater than or equal to about 15,000 g/mol and less than or equal to about 75,000 g/mol). Other values of number average molecular weight are possible.

In some embodiments, the Z-average molecular weight ($M_z$) of the fibers may be greater than or equal to about 100,000 g/mol, greater than or equal to about 130,000 g/mol, greater than or equal to about 150,000 g/mol, greater than or equal to about 175,000 g/mol, greater than or equal to about 200,000 g/mol, greater than or equal to about 225,000 g/mol, greater than or equal to about 250,000 g/mol, greater than or equal to about 275,000 g/mol, greater than or equal to about 300,000 g/mol, greater than or equal to about 325,000 g/mol, greater than or equal to about 350,000 g/mol, or greater than or equal to 375,000 g/mol. In some instances, Z-average molecular weight of the fibers may be less than or equal to about 400,000 g/mol, less than or equal to about 375,000 g/mol, less than or equal to about 350,000 g/mol, less than or equal to about 325,000 g/mol, less than or equal to about 300,000 g/mol, less than or equal to about 275,000 g/mol, less than or equal to about 250,000 g/mol, less than or equal to about 200,000 g/mol, less than or equal to about 175,000 g/mol, less than or equal to about 150,000 g/mol, or less than or equal to about 125,000 g/mol. It should be understood that all combinations of the above-referenced ranges are possible (e.g., greater than or equal to about 130,000 g/mol and less than or equal to about 300,000 g/mol, greater than or equal to about 100,000 g/mol and less than or equal to about 400,000 g/mol). Other values of Z-average molecular weight are also possible.

In some embodiments, the weight average molecular weight ($M_w$) of the fibers may be greater than or equal to about 20,000 g/mol, greater than or equal to about 30,000 g/mol, greater than or equal to about 40,000 g/mol, greater than or equal to about 50,000 g/mol, greater than or equal to about 60,000 g/mol, greater than or equal to about 70,000 g/mol, greater than or equal to about 80,000 g/mol, greater than or equal to about 90,000 g/mol, greater than or equal to about 100,000 g/mol, or greater than or equal to about 110,000 g/mol. In some instances, the weight average molecular weight of the fibers may be less than or equal to about 120,000 g/mol, less than or equal to about 110,000 g/mol, less than or equal to about 100,000 g/mol, less than or equal to about 90,000 g/mol, less than or equal to about 80,000 g/mol, less than or equal to about 70,000 g/mol, less than or equal to about 60,000 g/mol, less than or equal to about 50,000 g/mol, less than or equal to about 40,000 g/mol, or less than or equal to about 30,000 g/mol. It should be understood that all combinations of the above-referenced ranges are possible (e.g., greater than or equal to about 50,000 g/mol and less than or equal to about 90,000 g/mol, greater than or equal to about 20,000 g/mol and less than or equal to about 120,000 g/mol). Other values of weight average molecular weight are also possible.

Figure 2:
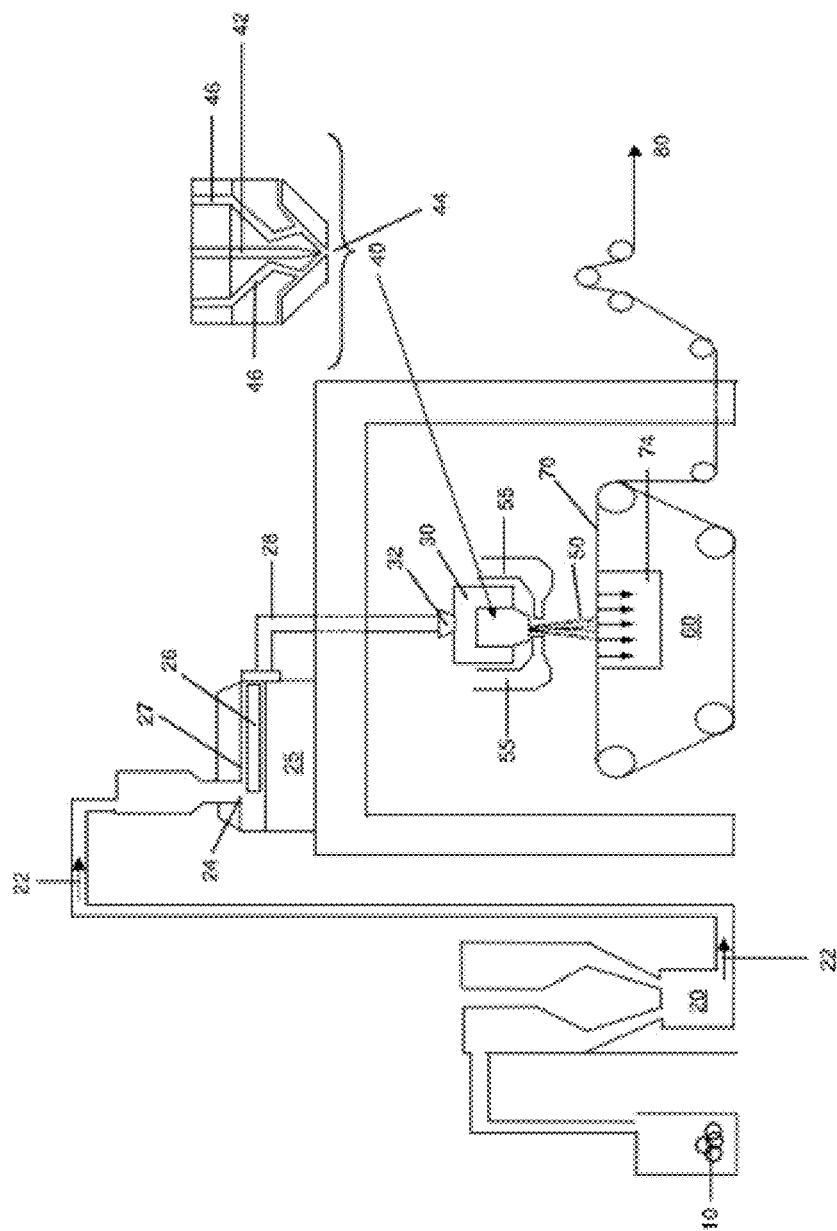
FIG. 2 is a schematic diagram showing a process for fiber formation according to one set of embodiments.

In general, any suitable polymer extrusion process known to those of skill in the art can be used. For instance, in some embodiments, the extrusion system shown in FIG. 2 may be used. As shown in FIG. 2, a polymer composition 10, which may be in any suitable form (e.g., granular, pellet, etc.), may be introduced into a mixer 20, where the polymer composition can be optionally combined with one more additives. In some embodiments, prior to introduction into the mixer 20, the polymer composition 10 may be pre-compounded. In general, any pre-compounding method known to those of skill in the art may be used (e.g., melting, blending, pelletizing, and combinations thereof). In some instances, the pre-compounding process may utilize a co-rotating, twin screw extruder to adequately blend the resin while preventing extended thermal history and degradation. With the use of a co-rotating, twin screw extruder, two or more polymers may be intimately mixed to form a molten, homogeneous mixture. The temperature profile used in the extruder and/or the methodology of polymer addition may be adjusted to vary the degree of homogeneity of the final, compounded product. Additionally, the use of additives to modify the interfacial tensions between the various polymeric components may be used to enhance miscibility of the polymers. In other embodiments, the pre-compounding process may occur in the mixer.

From the mixer, the polymer composition may then be transported in the direction of arrows 22 towards an inlet 24 of an extruder 25. The extruder includes an extruder screw 26 that is mounted for rotation within an extruder barrel 27. Through the rotation of the screw, the polymer composition is conveyed downstream within the extruder barrel, which may be heated to a desired temperature to create a fluid stream of the polymer composition. The polymer composition is heated (generally slowly) from the inlet of the extruder to the outlet of the extruder to allow the polymer composition to flow more easily. The stream of the polymer composition may then flow into one or more conduits 28 fluidically connecting the extruder to a die body 30 (e.g., connecting the extruder outlet to a die body inlet). The volume between the extruder inlet and a die outlet 44 collectively define a processing space having a particular internal volume that can be used to calculate the dwell time of the polymer composition, as described in more detail below.

As shown illustratively in FIG. 2, a melt pump 32 may be positioned between conduit 28 and the die body. The melt pump can help control the amount of polymer throughput (lb/hr) delivered to the die body. The die body has a die temperature which influences the temperature of the polymer composition in the die body, including the temperature of the polymer in a spin pack 40 connected to the die body. The spin pack may include one or more channels 42 allowing the polymer to flow towards a die outlet 44 (e.g., a die tip) including one or more holes. The spin pack also includes one or more additional channels 46 which can allow air or other gases to flow towards the die tip. As the melted polymer exits the one or more die outlets, the air flowing in channels 46 attenuates the polymer into fibers. The polymer exiting the one or more holes of the die outlet is formed into fibers 50 onto a collector table 60 which includes a collector belt 70. The fibers collected onto the collector belt may be pulled towards the collector table using a suction box 74. The fibers collected onto the collector belt form a fiber web. The collector belt transports the fiber web to a winder 80 where the fiber web can be further processed if desired.

In some embodiments, the polymer exiting the one or more holes of the die outlet may be formed into meltblown fibers. The diameter of the fibers may be controlled, in part, by air or other gases introduced into channels 55, which can be used to quench the fibers. The heated, high velocity air impinges the polymer on either side of the die outlet as the polymer exits out of the die outlet. This air may attenuate the fiber to the final fiber size. The fibers collected onto the collector belt may be pulled towards the collector table using the suction box 74. The fibers collected onto the collector belt form a fiber web.

In some embodiments, the fiber web may be formed via a spinning process (e.g., centrifugal spinning).

In certain embodiments, forming fibers having a relatively small diameter may involve controlling the dwell time of the polymeric material in a processing space of a system such as the one shown in FIG. 2. The dwell time is the time the polymeric material spends in a processing space, which includes the combined volume where the polymeric material can reside between an extruder inlet and a die outlet, within the temperature- and pressure-controlled confines of the extrusion process. The combined volume may include, for example, the volume of the extruder (e.g., extruder barrel), die body, and any conduits fluidically connecting the extruder and die body. The dwell time can be calculated using the formula:

$$\text{Dwell time} = V \cdot \rho / Th \quad (1)$$

where V is the volume of the processing space as defined above, $\rho$ is the density of the polymeric material being extruded, and Th is the throughput of the polymeric material through the die body.

In certain embodiments, the dwell time may greater than or equal to about 1 minute, greater than or equal to about 5 minutes, greater than or equal to about 25 minutes, greater than or equal to about 50 minutes, greater than or equal to about 75 minutes, greater than or equal to about 100 minutes, greater than or equal to about 250 minutes, greater than or equal to about 500 minutes, greater than or equal to about 750 minutes, greater than or equal to about 1,000 minutes, greater than or equal to 1,250 minutes, greater than or equal to about 1,500 minutes, greater than or equal to about 1,750 minutes. In some instances, the dwell time may be less than or equal to about 2, 600 minutes, less than or equal to about 2,300 minutes, less than or equal to about 2,000 minutes, less than or equal to about 1,750 minutes, less than or equal to about 1,500 minutes, less than or equal to about 1,000 minutes, less than or equal to about 750 minutes, less than or equal to about 500 minutes, less than or equal to about 250 minutes, less than or equal to about 100 minutes, less than or equal to about 75 minutes, less than or equal to about 50 minutes, less than or equal to about 25 minutes, less than or equal to about 10 minutes, less than or equal to about 5 minutes, or less than or equal to about 2 minutes. It should be understood that all combination of the above-referenced ranges are possible (e.g., greater than or equal to about 5 minutes and less than or equal to about 75 minutes, greater than or equal to about 1 minutes and less than or equal to about 2,600 minutes). Other ranges and values of dwell time are also possible.

The polymer composition, described herein, may allow for lower throughputs than conventional polymer compositions due in part to the material toughness and/or the high melt flow index. For instance, in some embodiments, the polymer throughput may be greater than or equal to about 1 lb/hour greater than or equal to about 5 lb/hour, greater than or equal to about 10 lb/hour, greater than or equal to about 20 lb/hour, greater than or equal to about 40 lb/hour, greater than or equal to about 60 lb/hour, greater than or equal to about 80 lb/hour, greater than or equal to about 100 lb/hour, greater than or equal to about 120 lb/hour, greater than or equal to about 140 lb/hour, greater than or equal to about 160 lb/hour, or greater than or equal to about 180 lb/hour. In some instances, the polymer throughput may be less than or equal to about 200 lb/hour, less than or equal to about 180 lb/hour, less than or equal to about 160 lb/hour, less than or equal to about 140 lb/hour, less than or equal to about 120 lb/hour, less than or equal to about 100 lb/hour, less than or equal to about 80 lb/hour, less than or equal to about 60 lb/hour, less than or equal to about 40 lb/hour, less than or equal to about 20 lb/hour, less than or equal to about 10 lb/hour, or less than or equal to about 5 lb/hour. It should be understood that all combinations of the above-referenced ranges are possible (e.g., greater than or equal to about 10 lb/hour and less than or equal to about 100 lb/hour, greater than or equal to about 1 lb/hour and less than or equal to about 200 lb/hour). Other ranges and values of polymer throughput are also possible.

The extruder barrel diameter (e.g., the inner diameter of the barrel) may be varied in some embodiments and may be chosen to match the size of the extruder screw. For example, an extruder screw having a 4 inch diameter may be matched with an extruder barrel having an inner diameter of about 4.0 inches. In some embodiments, the extruder barrel may have an inner diameter of greater than or equal to about 0.25 inches, greater than or equal to about 0.5 inches, greater than or equal to about 0.75 inches, greater than or equal to about 1 inch, greater than or equal to about 2 inches, greater than or equal to about 3 inches, greater than or equal to about 4 inches, or greater than or equal to about 5 inches. In some instances, the extruder barrel may have an inner diameter of less than or equal to about 6 inches, less than or equal to about 5 inches, less than a equal to about 4 inches, less than or equal to about 3 inches, less than or equal to about 2 inches, less than or equal to about 1 inch, less than or equal to about 0.75 inches, or less than or equal to about 0.5 inches. It should be understood that all combinations of the above-referenced ranges are possible (e.g., greater than or equal to about 1 inch and less than or equal to about 4 inches, greater than or equal to about 0.25 inches and less than or equal to about 6 inches). Other ranges and values of extruder barrel inner diameters are also possible.

In some embodiments, an extrusion process may include a particular die temperature range or value. In general, the die temperature may be selected to suitably soften (e.g., melt) the polymer composition that is to be formed into fibers. In some instances, the polymer composition, described herein, may be processed at higher temperatures than certain conventional systems due in part to the increased resistance to degradation. For instance, in some embodiments, the die temperature is greater than or equal to about 400° F., greater than or equal to about 420° F., greater than or equal to about 440° F., greater than or equal to about 460°, greater than or equal to about 480° F., greater than or equal to about 500° F., greater than or equal to about 520° F., greater than or equal to about 540° F., greater than or equal to about 560° F., greater than or equal to about 580° F., greater than or equal to about 600° F., or greater than or equal to about 620° F. In some instances, the die temperature is less than or equal to about 640° F., less than or equal to about 620° F., less than or equal to about 600° F., less than or equal to about 580° F., less than or equal to about 560° F., less than or equal to about 540° F., less than or equal to about 520° F., less than or equal to about 500° F., less than or equal to about 480° F., less than or equal to about 460° F., less than or equal to about 440° F., or less than or equal to about 420° F. It should be understood that all combinations of the above-referenced ranges are possible (e.g., greater than or equal to about 420° F. and less than or equal to about 580° F., greater than or equal to about 400° F. and less than or equal to about 640° F.). Other ranges and values of die temperatures are also possible.

It should be understood that the values and ranges of the parameters described above can be used in different combinations to control fiber formation during an extrusion process. For example, in some embodiments a relatively low dwell time and a relatively low throughput may be used to form fine fibers. For instance, in one set of embodiments, a method may include subjecting the polymeric material to a dwell time of less than or equal to about 30 minutes and a throughput of less than or equal to about 85 lbs/hr. In another set of embodiments, the polymeric material may have a dwell time of less than or equal to about 50 minutes and a throughput of less than or equal to about 55 lbs/hr. In some embodiments, using these or other parameters, fiber webs having relatively low surface densities of particles can be formed as described in more detail below.

In certain embodiments, a fiber web described herein may be combined with one or more other components such as a substrate and/or a scrim, optionally with an adhesive. Examples of substrates, scrims and adhesives are described in U.S. Publication No. 2009/0120048, filed Nov. 7, 2008, and entitled "Meltblown Filter Medium", which is incorporated herein by reference in its entirety for all purposes.

In some cases, a fiber web or a composite including a fiber web can be charged. In general, any of a variety of techniques can be used to charge the fiber web and or a composite including the fiber web to form an electret web. Examples include AC and/or DC corona discharge. In some embodiments, the composite is subjected to a discharge of at least 1 kV/cm (e.g., at least 5 kV/cm, at least 10 kV/cm), and/or at most 30 kV/cm (e.g., at most 25 kV/cm, at most 20 kV/cm). For example, in certain embodiments, the composite can be subjected to a discharge of from 1 kV/cm to 30 kV/cm (e.g., from 5 kV/cm to 25 kV/cm, from 10 kV/cm to 20 kV/cm). Exemplary processes are disclosed, for example, in U.S. Pat. No. 5,401,446, which, to the extent it is not inconsistent with the present disclosure, is incorporated herein by reference.

In some embodiments, a fiber web described herein can be a part of a filter element. Examples of filter elements include gas turbine filter elements, heavy duty air filter elements, automotive air filter elements, HVAC air filter elements, HEPA filter elements, vacuum bag filter elements, fuel filter elements, hydraulic filter elements, and oil filter elements. Such filter elements can be incorporated into corresponding filter systems (gas turbine filter systems, heavy duty air filter systems, automotive air filter systems, HVAC air filter systems, HEPA filter systems, vacuum bag filter systems, fuel filter systems, hydraulic filter systems, and oil filter systems). In certain embodiments, the fiber web may be attached to a substrate. The substrate can be prepared using any suitable process (e.g., wet laid process, dry laid process). In some embodiments, the substrate may comprise cellulose fibers, synthetic fibers, glass fibers, and/or combinations thereof). A filter medium can optionally be pleated into any of a variety of configurations (e.g., panel, cylindrical). Examples of filter media are described in more detail in U.S. Publication No. 2009/0120048, filed Nov. 7, 2008, and entitled "Meltblown Filter Medium", which is incorporated herein by reference in its entirety for all purposes.

In certain embodiments in which the substrate comprises synthetic fibers, the synthetic fibers may include any suitable type of synthetic polymer. Non-limiting examples of suitable synthetic polymers include polyester, polycarbonate, polyamide, polyaramid, polyimide, polyethylene, polypropylene, polyether ether ketone, polyethylene terephthalate, polyolefin, nylon, acrylics, polyvinyl alcohol, liquid crystalline polymers, polyoxazole (e.g., poly(p-phenylene-2,6-benzobisoxazole)), regenerated cellulose (e.g., lyocell, rayon), and combinations thereof. In some embodiments, the synthetic fibers are organic polymer fibers. In certain embodiments, the synthetic fibers are staple fibers. In some cases, synthetic fibers may include meltblown fibers, which may be formed of polymers described herein (e.g., polyester, polypropylene). In other cases, the synthetic fibers may be electrospun fibers of fibers formed by centrifugal spinning.

EXAMPLES

Example 1

Three metallocene-catalyzed polypropylene components were used to form polymer compositions. The resulting polymer compositions had a broader molecular weight distribution, and higher $M_z$ than the individual polymer components. The melt flow index of the polymer composition was influenced by the weight percentage of each polymer component.

Two polymer compositions differing in the weight percentage of each metallocene catalyzed polypropylene component were formed. The weight percentages of the polymer components were selected to achieve a targeted melt flow index and molecular weight distribution. Theoretical values of melt flow index were calculated to assist in the selection of suitable weight percentages. The polymer compositions were formed by pre-compounding the polymer components to form a homogeneous blend.

The first polymer composition (i.e., composition 1) contained about 12 wt. % of a first polypropylene component, about 33 wt. % of a second polypropylene component, and about 55 wt. % of a third polypropylene component. Average molecular weights, the polydispersity index, and the melt flow index (MFI) in g/10 minutes for the first polymer composition are shown in Table 1. The second polymer composition (i.e., composition 2) contained about 5 wt. % of the first polypropylene component, about 25 wt. % of the second polypropylene component, and about 70 wt. % of the third polypropylene component. The melt flow index in g/10 minutes for the second polymer composition is shown in Table 1.

The second polymer composition had a lower wt. % of the polypropylene component with the lowest MFI (first polypropylene component) and a higher wt. % of the polypropylene component with the highest MFI (third polypropylene component) as compared to the first polymer composition. Accordingly, the second polymer composition had a higher MFI than the first polymer composition.

TABLE 1

| Molecular Weight Distributions and Melt Flow Indices | | | | | |
|---|---|---|---|---|---|
| Resin | $M_n$ | $M_w$ | $M_z$ | $M_w/M_n$ | MFI |
| Component 1 | 54,446 | 81,319 | 133,842 | 1.49 | 532 |
| Component 2 | 45,152 | 65,907 | 101,683 | 1.46 | 1,188 |
| Component 3 | 24,580 | 58,489 | 100,079 | 2.38 | 1,709 |
| Composition 1 | 52,718 | 84,595 | 163,389 | 1.61 | 845 |
| Composition 2 | — | — | — | — | 995 |

Comparative Example 1

The average molecular weights and melt flow index for each metallocene polypropylene component described in Example 1 was determined and are shown in Table 1. The first polymer composition in Example 1 had a greater Z-average molecular weight than each of its components. The second and third polypropylene components had lower average molecular weights than the first polymer composition in Example 1, but the third polypropylene component had a higher polydispersity index than the first polymer composition.

Example 2

The first polymer composition described in Example 1 was used to form a fiber web. The resulting fiber web had a smaller average fiber diameter, higher surface area, lower amount of process defects, and lower air permeability than fiber webs formed from a polymer composition containing a single polypropylene component (Comparative Example 2). The fibers in the resulting fiber web had a higher Z average molecular weight than fibers formed from a polymer composition containing a single polypropylene polymer.

An extrusion process similar to the one shown in FIG. 2 was used to form fiber webs from the polymer composition. The polymer composition contained about 12 wt. % of the first polypropylene component, about 33 wt. % of the second polypropylene component, and about 65 wt. % of the third polypropylene component, which was pre-compounded prior to extrusion. The extrusion process was performed at a polymer throughput of 20 lbs/hour and a die temperature of about 575° F.

Figure 3:
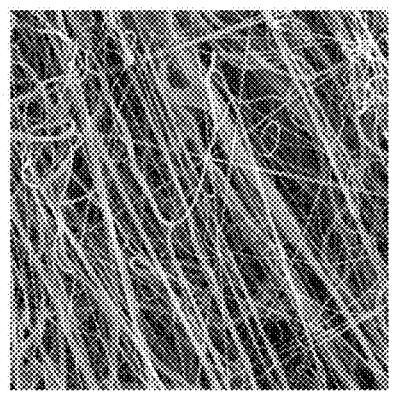
FIG. 3 is an SEM image showing polymeric fibers according to one set of embodiments.

The resulting fiber web had an average fiber diameter of about 0.4 microns, a BET surface area of about 3.31 $m^2/g$, a basis weight of about 2.8 $g/m^2$, and an air permeability of about 143 $CFM/ft^2$ at a 0.5" water column. The air permeability of the resulting fiber web, had the basis weight been 5.5 $g/m^2$ instead of 2.8 $g/m^2$, would have an extrapolated value of 72 $CFM/ft^2$. The fiber web was essentially free of process defects in the form of degraded particles as shown in FIG. 3.

The polymer composition was designed to not degrade during processing as highlighted by the average molecular weights of the fibers shown in Table 2. The Z-average molecular weight of the fibers were greater than the polymer composition and the number and weight average molecular weights were slightly reduced compared to the polymer composition (Example 1).

TABLE 2

Molecular Weight Distributions of the Fibers

| Web | $M_n$ | $M_w$ | $M_z$ | $M_w/M_n$ |
|---|---|---|---|---|
| Component 2 | 24586 | 57810 | 106566 | 2.35 |
| Component 3 | 37942 | 64436 | 112335 | 1.69 |
| Composition 1 | 31564 | 77202 | 170858 | 2.45 |

Comparative Example 2

Fiber webs were formed from polymer compositions containing either the second polypropylene component or the third polypropylene component. The fiber webs formed from polymer compositions containing either the second polypropylene component or the third polypropylene component had a higher fiber diameter, higher air permeability, lower surface area, and greater amount of process defects compared to Example 2. The fiber web formed from the second polypropylene component and the fiber web formed from the third polypropylene component had about an 83% and 228% increase, respectively, in fiber diameter compared to Example 2.

The fiber webs were formed using the process described in Example 2, except a die temperature of about 450° F. and the polymer throughput of about 20 lbs/hour were used. A lower die temperature and higher throughput had to be used due to differences in the processability of the polymer composition in Example 2 and the polymer compositions in this example.

The fiber web formed from the polymer composition containing the second polypropylene component had an average fiber diameter of about 0.7 microns, a basis weight of about 5.5 g/m², and an air permeability of about 91 CFM/ft². The fiber webs also had an increased amount of process defects compared to Example 2.

The fiber web formed from the polymer composition containing the third polypropylene component had an average fiber diameter of about 1.2 microns, a basis weight of about 5.5 g/m², and an air permeability of about 143 CFM/ft². The fiber webs also had an increased amount of process defects compared to Example 2.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A fiber web, comprising:
a plurality of fibers comprising a polypropylene composition comprising a first polypropylene component and a second polypropylene component, wherein the polypropylene composition has a $M_z$ of greater than or equal to about 100,000, a $M_n$ of less than or equal to about 55,000, a $M_z$ to $M_w$ ratio of greater than or equal to about 1.8 and less than about 3.2, and a melt flow index of greater than or equal to about 400 grams per 10 minutes.

2. A method, comprising:
providing a polypropylene composition comprising a first polypropylene component and a second polypropylene component, wherein the polypropylene composition has a Mz of greater than or equal to about 100,000, a Mn of less than or equal to about 55,000, a $M_z$ to $M_w$ ratio of greater than or equal to about 1.8 and less than about 3.2, and a melt flow index of greater than or equal to about 400 grams per 10 minutes; and
forming a plurality of fibers from the polypropylene composition.

3. The fiber web of claim 1, wherein the polymer composition comprises a third polypropylene component.

4. The fiber web of claim 1, wherein the first polypropylene component has a melt flow index of greater than or equal to about 300 g/10 minutes and less than 700 g/10 minutes.

5. The fiber web of claim 1, wherein the second polymer component has a melt flow index of greater than or equal to about 800 g/10 minutes and less than 1,600 g/10 minutes.

6. The fiber web of claim 3, wherein the third polymer component has a melt flow index of greater than or equal to about 1,300 g/10 minutes and less than 2,500 g/10 minutes.

7. The fiber web of claim 1, wherein the polypropylene composition has a melt flow index of less than 1,500 g/10 minutes.

8. The fiber web of claim 1, wherein the polypropylene composition has a $M_n$ of greater than or equal to about 25,000 g/mol.

9. The fiber web of claim 1, wherein the polypropylene composition has a $M_z$ of greater than or equal to about 130,000 g/mol and less than about 300,000 g/mol.

10. The fiber web of claim 1, wherein the polypropylene composition has a $M_w$ of greater than or equal to about 50,000 g/mol and less than about 125,000 g/mol.

11. The fiber web of claim 1, wherein the polypropylene composition has a polydispersity index of greater than or equal to about 1.8 and less than about 4.0.

12. The fiber web of claim 1, wherein the polypropylene composition has a Mz to Mw ratio of greater than or equal to about 1.9 and less than about 3.

13. The fiber web of claim 1, wherein the average diameter of the plurality of fibers is less than or equal to about 1 micron.

14. The fiber web of claim 1, wherein the fiber web has a surface density of particles formed of the polymeric material of less than about 1.0 particles/in², wherein each of the particles has a largest cross-sectional dimension of about 1.0 mm or greater.

15. The fiber web of claim 1, wherein the fiber web has a surface density of particles formed of the polymeric material of less than about 0.5 particles/in², wherein each of the particles has a largest cross-sectional dimension of about 1.0 mm or greater.

16. The method of claim 2, comprising pre-compounding the polypropylene composition.

17. The fiber web of claim 1, wherein the fiber web is made via a meltblown process.

18. The fiber web of claim 1, wherein the fiber web is made via a centrifugal spinning process.

19. An article, comprising:
a fiber web comprising a plurality of fibers comprising a polypropylene composition comprising a first polypropylene component and a second polypropylene component, wherein the polypropylene composition has a $M_z$ of greater than or equal to about 100,000, a $M_n$ of less than or equal to about 55,000, a $M_z$ to $M_w$ ratio of greater than or equal to about 1.9 and less than about 3, and a melt flow index of greater than or equal to about 400 grams per 10 minutes, and wherein the fiber web is attached to a substrate.

20. The article of claim 17, wherein the substrate comprises glass fibers.

21. The article of claim 19, wherein the substrate comprises cellulose fibers.

22. The article of claim 19, wherein the substrate comprises synthetic fibers.

23. The fiber web of claim 1, wherein the fiber web has a BET surface area of greater than or equal to 0.1 $m^2/g$ and less than or equal to about 6.0 $m^2/g$.

24. The fiber web of claim 1, wherein the fiber web has a BET surface area of greater than or equal to 1.5 $m^2/g$ and less than or equal to about 6.0 $m^2/g$.

25. A filter element comprising a fiber web comprising a plurality of fibers comprising a polypropylene composition comprising a first polypropylene component and a second polypropylene component, wherein the polypropylene composition has a $M_z$ of greater than or equal to about 100,000, a $M_n$ of less than or equal to about 55,000, a $M_z$ to $M_w$ ratio of greater than or equal to about 1.9 and less than about 3, and a melt flow index of greater than or equal to about 400 grams per 10 minutes.

26. The fiber web of claim 1, wherein each polypropylene component in the composition has a melt flow rate greater than about 25 grams per 10 minutes.

* * * * *